United States Patent
Kotagiri et al.

(10) Patent No.: US 6,478,854 B1
(45) Date of Patent: Nov. 12, 2002

(54) HIGH PURITY, LOW SILICA X-TYPE ZEOLITE BINDERLESS SHAPED PRODUCT AND GAS SEPARATION METHOD EMPLOYING IT

(75) Inventors: Yasuki Kotagiri, Shinnanyo (JP); Atsushi Harada, Shinnanyo (JP); Yoshiyuki Nakamoto, Hikari (JP); Satoshi Yoshida, Shinnanyo (JP); Shigeru Hirano, Shinnanyo (JP)

(73) Assignee: Tosoh Corporation, Yamaguchi-ken (JP)

( * ) Notice: Subject to any disclaimer, the term of this patent is extended or adjusted under 35 U.S.C. 154(b) by 0 days.

(21) Appl. No.: 09/669,213

(22) Filed: Sep. 25, 2000

(30) Foreign Application Priority Data

Nov. 25, 1999 (JP) .............................. 11-334146
Jan. 21, 2000 (JP) ...................... 2000-017772

(51) Int. Cl.[7] .............................................. B01D 53/047
(52) U.S. Cl. ........................... 95/96; 95/103; 95/130; 95/902; 423/710; 423/718; 502/79
(58) Field of Search ........................ 95/96–98, 100–106, 95/130, 902; 423/710, 711, 718; 502/79

(56) References Cited

U.S. PATENT DOCUMENTS

| | | | |
|---|---|---|---|
| 3,663,165 A | * 5/1972 | Haden, Jr. et al. | 423/711 |
| 3,906,076 A | 9/1975 | Goytisolo et al. | 423/118 |
| 4,603,040 A | 7/1986 | Kuznicki et al. | 423/328 |
| 4,859,217 A | 8/1989 | Chao | 55/68 |
| 5,152,813 A | * 10/1992 | Coe et al. | 95/902 X |
| 5,464,467 A | * 11/1995 | Fitch et al. | 95/902 X |
| 5,665,325 A | * 9/1997 | Verduijn | 423/710 X |
| 5,962,358 A | * 10/1999 | Hees et al. | 95/902 X |
| 5,993,773 A | 11/1999 | Funakoshi et al. | 423/709 |
| 6,036,939 A | * 3/2000 | Funakoshi et al. | 423/710 |
| 6,068,678 A | * 5/2000 | Labasque et al. | 95/902 X |
| 6,171,370 B1 | * 1/2001 | Hirano et al. | 95/902 X |
| 6,183,539 B1 | * 2/2001 | Rode et al. | 95/902 X |
| 6,261,344 B1 | * 7/2001 | Labasque et al. | 95/902 X |
| 6,270,557 B1 | * 8/2001 | Millet et al. | 95/902 X |
| 6,273,939 B1 | * 8/2001 | Millet et al. | 95/902 X |
| 6,306,363 B1 | * 10/2001 | Funakoshi et al. | 423/710 |

FOREIGN PATENT DOCUMENTS

| | | |
|---|---|---|
| EP | 0 893 157 A1 | 1/1999 |
| GB | 1 580 928 | 12/1980 |
| JP | 53-8400 | 1/1978 |
| JP | 61-222919 | 3/1986 |
| JP | 64-56112 | 3/1989 |
| JP | 5-163015 | 6/1993 |
| JP | 10-310422 | 11/1998 |
| JP | 11-76810 | 3/1999 |
| JP | 11-217212 | 8/1999 |
| JP | 11309370 | 11/1999 |

* cited by examiner

Primary Examiner—Robert H. Spitzer
(74) Attorney, Agent, or Firm—Nixon & Vanderhye P.C.

(57) ABSTRACT

There is provided, in a simple, rapid and efficient manner, a high purity, low silica X-type zeolite binderless shaped product with a high content of low silica X-type zeolite and high crystallinity, very high crush resistance and attrition resistance, and excellent adsorption performance. There is further provided an efficient gas separation method utilizing the high purity, low silica X-type zeolite binderless shaped product. With the high purity, low silica X-type zeolite binderless shaped product, the peak intensity of the faujasite zeolite at the index of 220 is stronger than the peak intensity at the index of 311 according to X-ray diffraction, and from approximately 60% to approximately 90% of the exchangeable cation sites are sodium while all or a portion of the remainder are potassium; the high purity, low silica X-type zeolite binderless shaped product also has all or a portion of the exchangeable cation sites are ion-exchanged with lithium.

20 Claims, 6 Drawing Sheets

HIGH PURITY, LOW SILICA X-TYPE ZEOLITE BINDERLESS SHAPED PRODUCT AND GAS SEPARATION METHOD EMPLOYING IT

BACKGROUND OF THE INVENTION

1. Field of the Invention

The present invention relates to a low silica X-type zeolite binderless shaped product which is a shaped product with a low $SiO_2/Al_2O_3$ molar ratio and a low X-type zeolite binder content. More particularly, it relates to a high purity, low silica X-type zeolite binderless shaped product which has a high purity and notably high adsorption capacity, which has excellent mechanical strength, and which is suitable for purposes such as separation and concentration of oxygen by adsorption separation from mixed gases, for example, gases composed mainly of nitrogen and oxygen, as well as to a gas separation method employing it. The gas separation method of the invention is, specifically, a gas separation method based on Pressure Swing Adsorption (hereunder abbreviated to PSA), and gases that may be separated and recovered thereby include oxygen gas, nitrogen gas, carbon dioxide gas, hydrogen gas and carbon monoxide gas.

Of these, oxygen gas is one of the particularly important industrial gases, which is widely used especially for ironworks and pulp bleaching. Recently, oxygen enriched combustion is being accomplished in the field of waste combustion and glass melting for the purpose of reducing $NO_x$ emissions that are unavoidable with combustion in air, and therefore oxygen gas is increasing in importance from the standpoint of environmental problems as well.

Known industrial production processes for oxygen gas include the PSA method, the cryogenic separation method, the membrane separation method, etc., but use of the PSA method is increasing because of its advantages in terms of oxygen gas purity and cost.

Oxygen gas production by the PSA method involves selective adsorption of nitrogen gas in the air onto an adsorbent, extraction of the remaining concentrated oxygen gas and collection thereof as the product. The adsorbent used for this purpose is crystalline zeolite which has a large nitrogen adsorption capacity, and particularly X-type zeolite which has a large porous capacity in the crystals is most widely used as the adsorbent for air separation by the PSA method.

Production of nitrogen gas is also possible by utilizing the selectively adsorbed nitrogen gas.

2. Description of the Related Art

X-type zeolite, like Y-type zeolite, is synthetic zeolite in which the crystalline structure is a faujasite structure; such crystals with a relatively low $SiO_2/Al_2O_3$ molar ratio, i.e. an $SiO_2/Al_2O_3$ molar ratio of 3.0 or lower, are referred to as X-type zeolite. The $SiO_2/Al_2O_3$ molar ratio of synthesized X-type zeolite is generally 2.5, but if NaOH and KOH are added during synthesis it is possible to reduce the $SiO_2/Al_2O_3$ molar ratio to 2.0. Reducing the $SiO_2/Al_2O_3$ molar ratio of zeolite increases the number of aluminum atoms in the crystals, and therefore the number of exchangeable cations increases. Adsorption of molecules of nitrogen and oxygen onto zeolite is generally known as physical adsorption, and a larger number of exchangeable cations offers a greater adsorption capacity.

Hereunder, X-type zeolite with a $SiO_2/Al_2O_3$ molar ratio of lower than 2.5, for example, X-type zeolite with a $SiO_2/Al_2O_3$ molar ratio of from 1.9 to 2.1 inclusive, will be referred to as "low silica X-type zeolite". Processes for production of low silica X-type zeolite are described in Japanese Unexamined Patent Publications (Kokai) (JP-A-53-8400, JP-A-61-222919, JP-A-01-56112, JP-A-10-310422, JP-A-11-217212, and elsewhere).

For industrial use of X-type zeolite as an adsorbent, clay or the like is usually added as a binder to synthesized X-type zeolite powder, and the mixture shaped into pellets or beads. The amount of clay added is about 20–30 parts, and the adsorption capacity of the shaped zeolite decreases by the amount of binder added with respect to the adsorption capacity of the zeolite powder. In order to overcome this, there have been proposed to date production processes for binderless shaped products, which are shaped with almost no binder. Such low silica X-type zeolite shaped products are described in Japanese Unexamined Patent Publications (JP-A-61-222919, JP-A-5-163015, JP-A-11-076810 and elsewhere).

Japanese Unexamined Patent Publication JP-A-61-222919 describes a process for production of a low silica X-type zeolite shaped product, called a macroscopic monolithic body of self-bonding zeolite, whereby no low silica X-type zeolite powder is used, but rather a shaped product of a kaolin starting material is transformed to metakaolin and then crystallized. According to this process, obtaining low silica X-type zeolite requires adding a large amount of a pore-forming substance (organic) to the shaped kaolin, heating and burning to make a porous metakaolin shaped product, and then crystallizing it.

However, because this process is accompanied by a very large exotherm due to burning of the organic substance, the temperature control is troublesome and it is a very difficult matter to successfully control the pores of the shaped product; moreover, since the pores must be actively formed, this creates the problems of notably impaired crush resistance and attrition resistance of the resulting low silica X-type zeolite shaped product. It is also inadequate in terms of the purity of the low silica X-type zeolite during shaping, and for example, A-type zeolite impurities are sometimes included during shaping, resulting in a low concentration of low silica X-type zeolite.

Conventional low silica X-type zeolite has peak intensities at index 111, 220, 331, 533, 642 and 751+555 in the following order.

| Intensity rank | Index |
| --- | --- |
| 1 | 111 |
| 2 | 533 |
| 3 | 751 + 555 |
| 4 | 642 |
| 5 | 220 |
| 6 | 331 |

The macroscopic monolithic body of self-bonding zeolite according to this patent has the same peak intensities in the following order.

| Intensity rank | Index |
| --- | --- |
| 1 | 111 |
| 2 | 751 + 555 |

| Intensity rank | Index |
| --- | --- |
| 3 | 642 |
| 4 | 533 |
| 5 | 331 |
| 6 | 220 |

In Japanese Unexamined Patent Publication JP-A-5-163015 there is described a process for production of a low silica X-type zeolite binderless shaped product 25 wherein a shaped product comprising X-type zeolite powder with an $SiO_2$ 2/Al2O3 molar ratio smaller than 2.5, kaolin clay transformed to metakaolin, sodium hydroxide and potassium hydroxide, is kept in an aqueous solution of sodium hydroxide and potassium hydroxide at a temperature of 40–100° C. for a few hours to a few days for aging and crystallization.

This process requires admixture of dangerous caustic chemicals during the mixing, kneading and shaping, and workability is poor, while the low silica X-type zeolite binderless shaped product obtained by the process naturally has low strength.

Japanese Unexamined Patent Publication JP-A-11-076810 also describes a low silica X-type zeolite shaped product of which at least 95% has an $SiO_2/Al_2O_3$ molar ratio of 2. The production process is a process in which a mixture obtained by aggregation of low silica X-type zeolite powder with a binder comprising at least 80% clay classified as kaolinite, halloysite, nacrite or dickite which is transformable to zeolite and 15% of montmorillonite as another clay, is shaped and dried and then calcinated at a temperature of 500–700° C., after which the resulting product is contacted for a few hours at 95° C. with at least a 0.5 molar concentration of a caustic solution, which is a solution of sodium hydroxide and potassium hydroxide, wherein the maximum potassium hydroxide content with respect to the total of sodium hydroxide+potassium hydroxide is 30 mole percent, and specifically with the caustic solution at 5.5 moles/liter. The low silica X-type zeolite binderless shaped product obtained by this process has, unsurprisingly, very low crush resistance and attrition resistance and includes A-type zeolite; moreover, since the $SiO_2/Al_2O_3$ molar ratio of the total based on chemical analysis or the $SiO_2/Al_2O_3$ molar ratio of the crystal lattice based on Si-NMR is higher than the theoretically ideal value of 2.0 for low silica X-type zeolite, and particularly the $SiO_2/Al_2O_3$ molar ratio of the total by chemical analysis is as high as 2.08, the low silica X-type zeolite purity is also insufficient during shaping.

When the crush resistance and attrition resistance of the low silica X-type zeolite binderless shaped product are weak, its use as an adsorbent, for example, when separating and concentrating oxygen from mixed gas composed mainly of nitrogen and oxygen by adsorption separation, where the mixed gas and the low silica X-type zeolite binderless shaped product are repeatedly contacted, results in fracture, flaking or other defects in the shaped product, which can lead to troubles including clogging of the channels and valves of the adsorbent system, increased pressure drop of the shaped product-packed layer, or inclusion of foreign substances in the produced gas.

Moreover, a low purity of the low silica X-type zeolite in the shaped product results in poor adsorption properties, and since A-type zeolite has a particularly high adsorption capacity for oxygen, inclusion of A-type zeolite adversely affects the adsorption properties especially when separating and concentrating oxygen by adsorption separation from mixed gases composed mainly of nitrogen and oxygen.

The present invention avoids the difficulties described above by providing, in a simple, rapid and efficient manner, a high purity, low silica X-type zeolite binderless shaped product with a high content of low silica X-type zeolite, very high crush resistance and attrition resistance, and excellent adsorption performance, as well as a gas separation method whereby nitrogen is efficiently adsorbed and separated from a mixed gas containing nitrogen and oxygen utilizing the high purity, low silica X-type zeolite binderless shaped product as the adsorbent.

SUMMARY OF THE INVENTION

The present inventors have achieved the present invention based on diligent research on various factors governing the properties of low silica X-type zeolite binderless shaped products and their production.

The gist of the present invention is as follows.

(1) A high purity, low silica X-type zeolite binderless shaped product, wherein the peak intensity of the faujasite zeolite at the index of 220 is stronger than the peak intensity at the index of 311 according to X-ray diffraction, the content of the low silica X-type zeolite is at least 95% and the $SiO_2/Al2O_3$ molar ratio is 2.00±0.05.

(2) A high purity, low silica X-type zeolite binderless shaped product, which is a high purity, low silica X-type zeolite binderless shaped product according to (1) wherein the peak intensities at index 111, 751+555, 642, 533, 220, 311 and 331 for the faujasite zeolite according to X-ray diffraction are in the order listed below, from approximately 60% to approximately 90% of the exchangeable cation sites are sodium, and all or a portion of the remainder are potassium.

| Intensity rank | Index |
| --- | --- |
| 1 | 111 |
| 2 | 751 + 555 |
| 3 | 642 |
| 4 | 533 |
| 5 | 220 |
| 6 | 311 |
| 7 | 331 |

(3) An ion-exchanged high purity, low silica X-type zeolite binderless shaped product, which is a high purity, low silica X-type zeolite binderless shaped product according to (1) or (2) wherein all or a portion of the exchangeable cation sites are ion-exchanged with lithium, and when cations other than lithium are present they are cations selected from among alkali metals, alkaline earth metals and transition metals or their mixtures.

(4) An ion-exchanged high purity, low silica X-type zeolite binderless shaped product according to (3), wherein the peak intensities at index 111, 642, 331, 533, 751+555, 220 and 311 for the faujasite zeolite according to X-ray diffraction are in the order listed below.

| Intensity rank | Index |
| --- | --- |
| 1 | 111 |
| 2 | 642 |
| 3, or 4 | 331 or 533 |
| 5 | 751 + 555 |
| 6 | 220 |
| 7 | 311 |

(5) A high purity, low silica X-type zeolite binderless shaped product or ion-exchanged high purity, low silica X-type zeolite binderless shaped product according to any one of (1) to (4), characterized in that the ratio of the peak intensity attributed to Si-3Al and the peak intensity attributed to Si-4Al according to Si-NMR measurement is such that:

(peak intensity for Si-3Al)/peak intensity for Si-4Al)<0.1

(6) A high purity, low silica X-type zeolite binderless shaped product or ion-exchanged high purity, low silica X-type zeolite binderless shaped product according to (5), characterized in that the content of the low silica X-type zeolite is 98% or greater.

(7) A high purity, low silica X-type zeolite binderless shaped product or ion-exchanged high purity, low silica X-type zeolite binderless shaped product according to (5) or (6), characterized in that the average value for the crush resistance measured for representative particles sorted to a particle size of 1.4–1.7 mm is 0.7 kgf or greater.

(8) A high purity, low silica X-type zeolite binderless shaped product or ion-exchanged high purity, low silica X-type zeolite binderless shaped product according to (5) or (6), characterized in that the average value for the crush resistance measured for representative particles sorted to a particle size of 1.4–1.7 mm is 1.0 kgf or greater.

(9) A process for production of a high purity, low silica X-type zeolite binderless shaped product or ion-exchanged high purity, low silica X-type zeolite binderless shaped product according to any one of (1) to (8), characterized by mixing, kneading, shaping and calcining low silica X-type zeolite with an $SiO_2/Al_2O_3$ molar ratio of from 1.9 to 2.1 inclusive and kaolin clay with an $SiO_2/Al_2O_3$ molar ratio of from 1.9 to 2.1 inclusive, to obtain a low silica X-type zeolite-containing shaped product, and contacting the low silica X-type zeolite-containing shaped product with a caustic solution to transform all or a portion of the kaolin clay in the low silica X-type zeolite-containing shaped product to low silica X-type zeolite, thereby forming a low silica X-type zeolite binderless shaped product with a $SiO_2/Al_2O_3$ molar ratio which is lower than the $SiO_2/Al_2O_3$ molar ratio of the low silica X-type zeolite starting material.

(10) A process for production of a high purity, low silica X-type zeolite binderless shaped product or ion-exchanged high purity, low silica X-type zeolite binderless shaped product according to (9), characterized in that the caustic solution used dissolves a greater amount of Si than Al from the low silica X-type zeolite-containing shaped product.

(11) A process for production of a high purity, low silica X-type zeolite binderless shaped product or ion-exchanged high purity, low silica X-type zeolite binderless shaped product according to (9) or (10), characterized in that the shaped product is contacted for at least 10 hours with a caustic solution of 6 moles/liter or greater.

(12) A process for production of a high purity, low silica X-type zeolite binderless shaped product or ion-exchanged high purity, low silica X-type zeolite binderless shaped product according to any one of (9) to (11), characterized in that the shaped product is contacted for at least 5 hours with a caustic solution of 8 moles/liter or greater.

(13) A process for production of a high purity, low silica X-type zeolite binderless shaped product or ion-exchanged high purity, low silica X-type zeolite binderless shaped product according to (9) or (10) characterized in that the shaped product is contacted with a caustic solution to which Al has been previously added.

(14) A gas separation method characterized by contacting a mixed gas with a packed layer which is packed with one or a plurality of high purity, low silica X-type zeolite binderless shaped products or ion-exchanged high purity, low silica X-type zeolite binderless shaped products according to any one of (1) to (8) and has a combined or multilayer structure, and selectively adsorbing at least one constituent gas of the constituent gases in the gas.

(15) A nitrogen gas/oxygen gas separation method, which is a gas separation method according to (14) characterized in that the gas is air, nitrogen gas is selectively adsorbed onto the packed layer and oxygen gas is allowed to pass through the packed layer for separation from the nitrogen gas.

(16) A nitrogen gas/oxygen gas separation method, which is a nitrogen gas/oxygen gas separation method according to (15) characterized in that in pressure swing adsorption, after selective adsorption of nitrogen gas in the air onto the packed layer under high pressure conditions, the pressure is reduced to desorb the adsorbed nitrogen and restore the packed layer.

(17) A nitrogen gas/oxygen gas separation method, which is a nitrogen gas/oxygen gas separation method according to (16) characterized in that the operation involves an adsorption step of contacting air with the packed layer to selectively adsorb nitrogen and to collect or discharge the concentrated oxygen from an outlet of the packed layer, a regeneration step of interrupting contact between the air and the packed layer to reduce the pressure in the packed layer and to desorb and collect or discharge the adsorbed nitrogen, and a repressurization step of pressurizing the packed layer by the concentrated oxygen obtained in the adsorption step.

(18) A nitrogen gas/oxygen gas separation method, which is a nitrogen gas/oxygen gas separation method according to (17) characterized in that the adsorption pressure during the adsorption step is in the range of 600 Torr to 1520 Torr inclusive.

(19) A nitrogen gas/oxygen gas separation method, which is a nitrogen gas/oxygen gas separation method according to (17) or (18) characterized in that the regeneration pressure during the regeneration step is in the range of 100 Torr to 400 Torr inclusive.

(20) A nitrogen gas/oxygen gas separation method, which is a nitrogen gas/oxygen gas separation method according to any one of (17) to (19) characterized in that the repressurization pressure during the repressurization step is in the range of 400 Torr to 800 Torr inclusive.

DETAILED DESCRIPTION OF THE INVENTION

Figure 1:
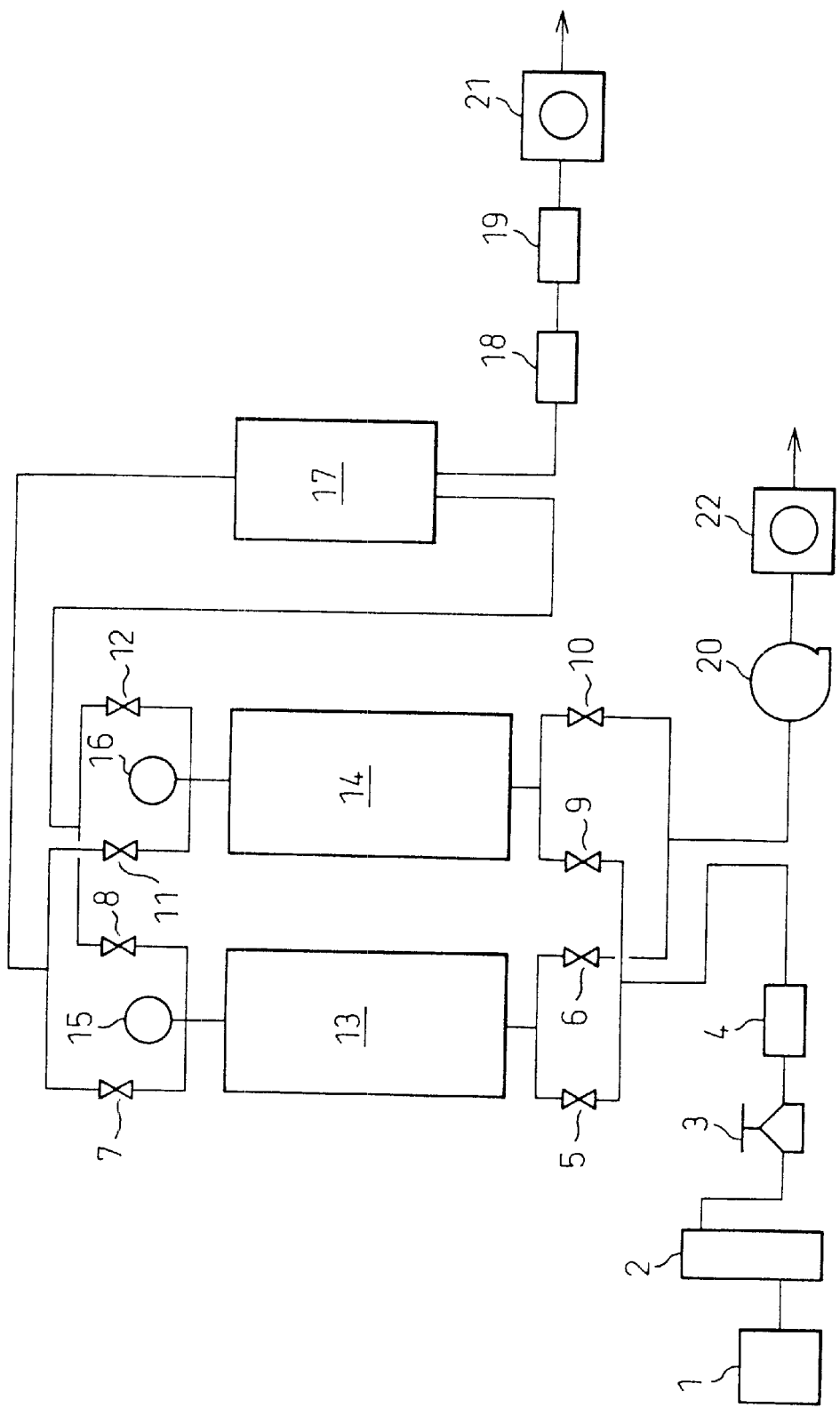
FIG. 1 is a system diagram for an air separation performance testing apparatus.

The present invention will now be explained in greater detail.

Principle of the Invention

When the low silica X-type zeolite-containing shaped product is contacted with the caustic solution, the highly reactive metakaolin in the low silica X-type zeolite-containing shaped product is transformed to low silica X-type zeolite while incorporating the sodium or potassium in the caustic solution, thus forming a low silica X-type zeolite binderless shaped product. While a full explanation cannot be given regarding the mechanism of the transformation of the metakaolin to low silica X-type zeolite, it is conjectured that a significant amount of the Al and Si are temporarily eluted in the caustic solution during the binderless conversion process, and the eluted Al or Si forms minute low silica X-type zeolite clusters while incorporating the alkali metals in the caustic solution, which again adher to and precipitate on the low silica X-type zeolite-containing shaped product, and thus binderless conversion proceeds.

The present inventors focused on the crystal growth surfaces of low silica X-type zeolite that grows in this binderless conversion process, and have succeeded in obtaining a high-strength low silica X-type zeolite binderless shaped product with notably improved low silica X-type zeolite content and crystallinity that has not been achievable according to the prior art, by optimizing the binderless conversion conditions so that, in X-ray diffraction of faujasite zeolite, the peak intensity at the index of 220 is stronger than the peak intensity at the index of 311. It has been discovered that for purity and strength of the low silica X-type zeollite binderless shaped product, it is important for the $SiO_2/Al_2O_3$ molar ratio of the low silica X-type zeolite to be close to the theoretical ideal value of 2.0, for the crystallinity of the low silica X-type zeolite that is produced to be increased, and to avoid inclusion or production of impurities, during the process of transformation of the metakaolin to low silica X-type zeolite. Thus, the present invention provides a high strength, high purity, low silica X-type zeolite binderless shaped product that achieves the objects described above, wherein the peak intensity of the faujasite zeolite at the index of 220 is stronger than the peak intensity at the index of 311 according to X-ray diffraction, from approximately 60% to approximately 90% of the exchangable cation sites are sodium and all or a portion of the remainder are potassium, and the peak intensities at index 111, 751+555, 642, 533, 220, 311 and 331 for the faujasite zeolite are in the order listed bellow:

| Intensity rank | Index |
|---|---|
| 1 | 111 |
| 2 | 751 + 555 |
| 3 | 642 |
| 4 | 533 |
| 5 | 220 |
| 6 | 311 |
| 7 | 331 | or wherein the peak intensities at index 111, 642, 331, 533, 751+555, 220 and 311 for the faujasite zeolite, in which all or a portion of the exchangeable cation sites are ion-exchanged with lithium, are in the order listed below.

| Intensity rank | Index |
|---|---|
| 1 | 111 |
| 2 | 642 |
| 3 or 4 | 331 or 533 |
| 5 | 751 + 555 |
| 6 | 220 |
| 7 | 311 |

Moreover, a high purity, low silica X-type zeolite binderless shaped product according to the invention having an $SiO_2/Al_2O_3$ molar ratio of 2.0±0.05 and a low silica X-type zeolite content of 95% or greater, and preferably 98% or greater, not only has a specified peak intensity order according to X-ray diffraction, but also preferably has a ratio of the peak intensity attributed to Si-3Al and the peak intensity attributed to Si-4Al according to Si-NMR measurement which is represented by the following relationship:

(peak intensity for Si-3Al)/peak intensity for Si-4Al)<0.1

The high purity low silica X-type zeolite binderless shaped product of the invention has a very high purity of low silica X-type zeolite and a very high crystallinity, and therefore the adsorption capacity and the strength are very high; in particular, it was found that when all or a portion of the exchangeable cation sites are ion-exchanged with lithium, for example, when it is used as an adsorbent that separates and concentrates oxygen from mixed gas composed mainly of nitrogen and oxygen by a method of adsorption separation, the performance is drastically improved over low silica X-type zeolite binderless shaped products based on the prior art methods.

The present inventors have achieved the invention based on the results of diligent research focused on the finding that in the process of binderless conversion in which metakaolin is converted to low silica X-type zeolite, the behavior of Al and Si that elute into the caustic solution has a major effect on the purity or crystallinity and strength of the resulting low silica X-type zeolite binderless shaped product; for example, it has a notable effect on performance when the product is used as an adsorbent for the purpose of separating and concentrating oxygen by a method of adsorption from a mixed gas composed mainly of nitrogen and oxygen.

The present inventors have also achieved the invention based on the discovery that, in the process of transformation of metakaolin to low silica X-type zeolite in a low silica X-type zeolite-containing shaped product, a $SiO_2/Al_2O_3$ molar ratio which is close to the theoretical ideal value of 2.0 and a lack of transformation of metakaolin to impurities, are both closely related to the dissolution behavior of Al and Si in the caustic solution contacted therewith.

A caustic solution with dissolution behavior of Al and Si such that the $SiO_2/Al_2O_3$ molar ratio is close to the theoretical ideal value of 2.0 and the metakaolin is not converted to impurities in the process of transformation of metakaolin to low silica X-type zeolite in a low silica X-type zeolite-containing shaped product, as discovered by the present inventors, is a caustic solution which dissolves a greater amount of Si than Al from the low silica X-type zeolite-containing shaped product, or which has Al added thereto beforehand. Using such a caustic solution for binderless conversion makes it possible to convert the metakaolin to high purity, low silica X-type zeolite at a high efficiency while actively incorporating Al, thus resulting in a low silica X-type zeolite binderless shaped product with high strength and high purity that has not been achievable according to the prior art.

The present invention will now be explained in further detail.

Low Silica X-type Zeolite Powder

The low silica X-type zeolite powder to be used for the invention may be produced by the process described in Japanese Unexamined Patent Publications (Kokai) (JP-A-53-8400, JP-A-1-56112, JP-A-10-310422, JP-A-11-217212 or elsewhere).

For example, Japanese Unexamined Patent Publication JP-A-53-8400 discloses a process for obtaining low silica X-type zeolite powder whereby a solution containing various ions such as sodium, potassium, aluminates and silicates is mixed to obtain a mixture with the composition listed below, and crystallization is carried out for an adequate time at a temperature of about 50° C. until crystallization is complete.

| | |
|---|---|
| $SiO_2/Al_2O_3$ | 1.3–2.2 |
| $(Na_2O + K_2O)/SiO_2$ | 2.0–4.5 |
| $Na_2O/(Na_2O + K_2O)$ | 0.6–0.9 |
| $H_2O/(Na_2O + K_2O)$ | 10–35 |

Also, Japanese Unexamined Patent Publication JP-A-11-217212 describes a process for efficient production of high purity, low silica X-type zeolite powder on a large-scale and in a short time, whereby an aluminate-containing solution and a silicate-containing solution are mixed and gelled, and then matured and crystallized to produce a low silica X-type zeolite powder, at which time a zeolite other than the produced zeolite is added before the completion of aging.

Production of Low Silica X-type Zeolite Shaped Product

10–50 parts by weight and preferably 15–25 parts by weight of kaolin clay with an $SiO_2/Al_2O_3$ molar ratio of from 1.9 to 2.1 inclusive as well as water are combined with 100 parts by weight of the low silica X-type zeolite powder with an $SiO_2/Al_2O_3$ molar ratio of from 1.9 to 2.1 inclusive obtained by this process, and the mixture is uniformly kneaded while adjusting the water content. The mixing of the low silica X-type zeolite powder and the kaolin clay is preferably carried out to some extent in a dry state before adding the water, and then the necessary amount of water added for mixing and kneading, since this is effective for obtaining a uniform kneaded product. If the amount of kaolin clay added is too small the resulting shaped product strength will not be sufficient, and if it is too large the crystallization will not proceed adequately and the purity of the low silica X-type zeolite in the low silica X-type zeolite binderless shaped product will be lower. The amount of water for adjustment of the kneaded product will differ depending on the amount of kaolin clay added and the subsequent granulating and shaping methods. With low kaolin addition the water content must be adjusted upward, and with higher addition it must be adjusted downward. This is because the water absorption of zeolite is greater than the water absorption of kaolin clay and therefore the amount of water giving properties suited for granulating and shaping will depend on the amount of kaolin clay added; the properties of the kneaded product suitable for granulating and shaping will also differ depending on the granulating and shaping methods. In order to increase the granulating and shaping properties of the kneaded product, various organic or inorganic granulating and shaping aids may be added to an extent that does not adversely or notably affect the subsequent calcination and binderless conversion steps.

The resulting kneaded product may be granulated and shaped by various granulating and shaping methods. As examples there may be mentioned pellet granulation by an extrusion granulating method, bead granulation by a stirring granulation method or tumbling granulation method, and sheet-like shaped products and monolithic shaped products with a honeycomb structure.

After drying the resulting granulated and shaped product, it is calcinated at a temperature of 500–700° C., and preferably 600–650° C., to obtain a low silica X-type zeolite-containing shaped product. The calcination is essential to facilitate transformation of the added kaolin clay to low silica X-type zeolite by the subsequent binderless conversion. The calcination converts the kaolin clay to amorphous metakaolin, transforming it to low silica X-type zeolite. The drying and calcining methods may be common methods, so long as the structure is such that heat treatment of the granulated and shaped product does not cause notable pooling of the moisture generated in the system, and for example, a hot air drier, muffle furnace, rotary kiln, tube furnace or the like may be used.

Synthesis of Binderless Shaped Product

It is a feature of the invention that the low silica X-type zeolite-containing shaped product obtained in the manner described above is contacted with a caustic solution that dissolves a greater amount of Si than Al from the low silica X-type zeolite-containing shaped product, or is contacted with a caustic solution to which Al has been added beforehand. For example, the caustic solution used is preferably a mixed solution of sodium hydroxide and potassium hydroxide. The mixing proportion for the sodium hydroxide and potassium hydroxide is preferably K/(Na+K)=0.1–0.4 in terms of molar ratio. The binderless conversion is inadequate at below 0.1 or greater than 0.4 of the above molar ratio, and impurities such as A-type zeolite, sodalite, F-type zeolite and E-type zeolite tend to be produced, which undesirably lowers the content of low silica X-type zeolite in the low silica X-type zeolite binderless shaped product.

A caustic solution that dissolves a greater amount of Si than Al from the low silica X-type zeolite-containing shaped product is, for example, a caustic solution wherein the solubility of Si is higher than the solubility of Al. The solubility in the solution differs depending on the composition, concentration and temperature of the solution, and therefore the composition and concentration of the caustic solution used will differ depending on the temperature of binderless conversion.

The temperature of binderless conversion may be 40° C. or higher, with a higher temperature being advantageous in terms of faster binderless conversion, but it is preferably 70–80° C. considering that transformation of metakaolin to low silica X-type zeolite is an exothermic reaction, and taking into account the temperature limit of the apparatus materials used and the aspect of inhibiting production of impurities.

Figure 2:
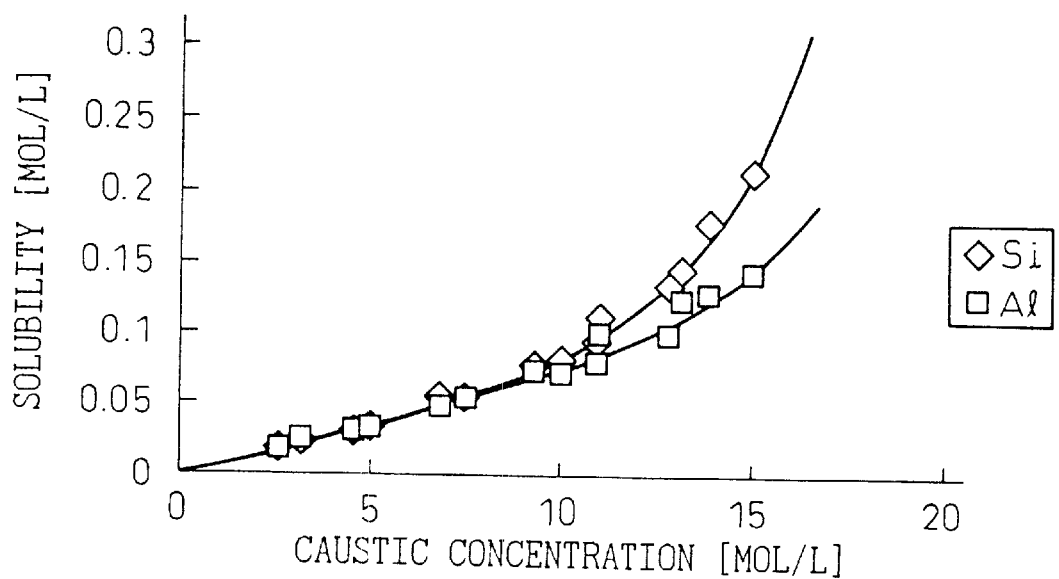
FIG. 2 is a graph showing the solubility of Si and Al in a caustic solution with a K/(Na+K) molar ratio of 0.28 at 70° C., as conducted in Example 8.
Figure 3:
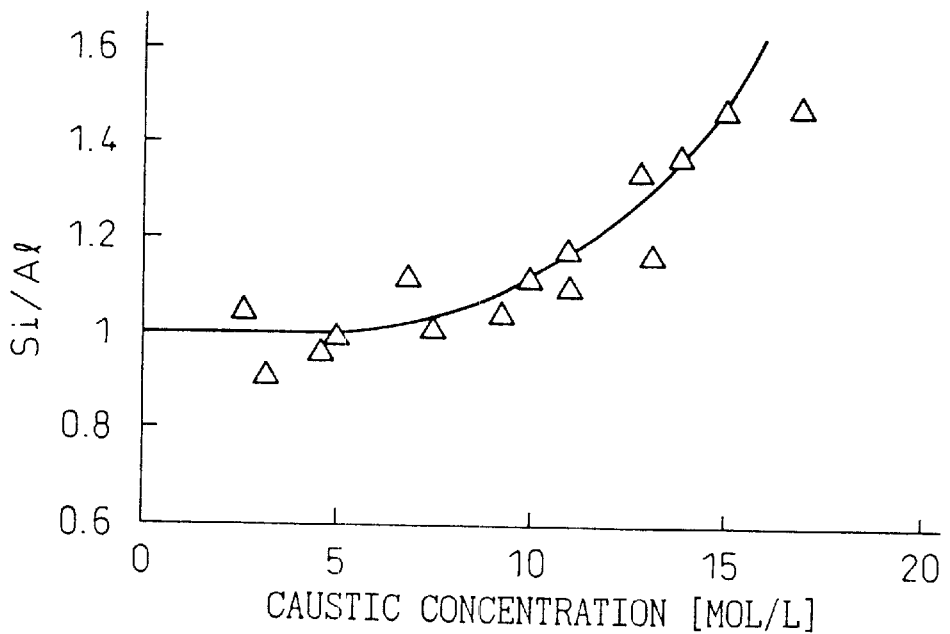
FIG. 3 is a graph showing the Si/Al molar ratio in a caustic solution with a K/(Na+K) molar ratio of 0.28 at 70° C., as conducted in Example 8.

Consequently, when the aforementioned mixing proportion of sodium hydroxide and potassium hydroxide is used and the temperature is in the range mentioned above, a caustic solution wherein the solubility of Si is higher than the solubility of Al is a solution having a caustic concentration of about 6 moles/liter or greater, with a higher concentration of the caustic solution increasing that degree and the effect becoming notable at about 8 moles/liter or greater, which is preferred for the advantage of faster binderless conversion. FIG. 2 and FIG. 3 show the solubilities of Si and Al in a 10 mole/liter caustic solution with a K/(Na+K) molar ratio of 0.28 at 70° C., and the Si/Al molar ratio in the caustic solution based on the solubilities. As shown in FIG. 2 and FIG. 3, a higher caustic solution concentration results in a higher Si solubility than Al solubility, but since the effect is minimal when the concentration is near 6 moles/liter, the binderless conversion proceeds insufficiently with a short treatment time for binderless conversion, the peak intensity at the index of 220 tends to become weaker than the peak intensity at the index of 311 according to X-ray diffraction of the faujasite zeolite, and transformation of the metakaolin to low silica X-type zeolite is also slower. On the other hand, a higher caustic solution concentration increases the effect, so that binderless conversion proceeds sufficiently in a short time, and the crystallinity increases.

Consequently, the time required for binderless conversion is usually a contact time of at least 10 hours when the caustic solution concentration is 6 moles/liter or greater, but may be only at least 5 hours when it is 8 moles/liter or greater.

A caustic solution with Al added beforehand may be, for example, a caustic solution to which water-soluble Al such as sodium aluminate has been added, or a caustic solution to which a solid Al source such as lower silica X-type zeolite or kaolin clay has been added; there are no restrictions on solid or other forms of Al so long as the Al is actively incorporated when the metakaolin is transformed to low silica X-type zeolite. It is preferred to reuse a caustic solution that has already been used one or more times for binderless conversion. When the Al has been added beforehand in this manner, the same effect is produced even with a low caustic solution concentration, as compared with no prior addition of Al, and the binderless conversion thus proceeds adequately.

The amount of alkali hydroxide metal in the caustic solution must preferably be at least 5 times the amount sufficient for all of the kaolin clay in the low silica X-type zeolite-containing shaped product to be transformed to low silica X-type zeolite. In particular, at least 10 times the amount is preferred for a high content of low silica X-type zeolite in the low silica X-type zeolite binderless shaped product and rapid binderless conversion, with 15–20 times being even more preferred. The amount of alkali hydroxide metal in the caustic solution which is necessary for all of the kaolin clay to be transformed to low silica X-type zeolite corresponds to an amount of alkali hydroxide metal which is equivalent to the Al in the kaolin clay.

However, at greater than 30 times this amount the degree of dissolution of Al and Si into the caustic solution increases, thus lowering the strength and increasing the amount of caustic solution required for performance of the adsorbent, but the temperature will normally be about 15–35° C.

There are no particular restrictions on the method of contacting the low silica X-type zeolite-containing shaped product and the caustic solution, but a simple and efficient method is to pack the low silica X-type zeolite-containing shaped product into a fixed-bed column and circulate the caustic solution through it.

Binderless Shaped Product and Ion Exchange

The binderless conversion described above results in a low silica X-type zeolite binderless shaped product wherein approximately 60% to approximately 90% of the exchangeable cation sites are sodium and the remainder are potassium.

The low silica X-type zeolite binderless shaped product that is obtained is washed and, if necessary, all or a portion of the cation sites are ion-exchanged with alkali metal cations such as sodium, potassium or lithium or alkaline earth metal cations such as calcium, or transition metal cations and/or their mixtures. In particular, when it is used for separation and concentration of oxygen from a mixed gas composed mainly of nitrogen and oxygen by adsorption separation, all or part of the exchangeable cation sites are ion-exchanged with lithium. That is, the lithium ion-exchange rate is such that lithium is ion-exchanged up to the desired ion-exchange rate, for example, 50% or greater, preferably 80% or greater and more preferably 95% or greater. After subsequent drying to a certain extent, it may be activated by calcination in a dehumidified air or nitrogen stream at 500–550° C. for use as an adsorbent.

These methods can be used to rapidly and efficiently obtain low silica X-type zeolite binderless shaped products with high purity, high crystallinity and high strength that have not been achievable by the prior art, and which exhibit notably improved adsorption capacity and attrition resistance after calcination-activation compared to low silica X-type zeolite binderless shaped products obtained according to the prior art.

Uses for Adsorbent

The high purity, low silica X-type zeolite binderless shaped product obtained by the process described above may be used as an adsorbent for adsorption separation whereby readily adsorbed components in a mixed gas are adsorbed for separation and concentration, such as for recovery of concentrated oxygen gas through selective adsorption of nitrogen in air. When oxygen in the air is concentrated and recovered by the PSA method, the operation involves a series of steps including an adsorption step in which the packed layer of a low silica X-type zeolite binderless shaped product used as the adsorbent is contacted with air for selective adsorption of nitrogen and the concentrated oxygen is collected from an outlet of the packed layer, a regeneration step in which contact between the air and the packed layer is interrupted to reduce the pressure in the packed layer and the adsorbed nitrogen is desorbed and discharged, and a repressurization step in which the packed layer is pressurized by the concentrated oxygen obtained in the adsorption step. A plurality of adsorption columns, usually two or three columns, are used for the PSA apparatus for air separation. The starting air is supplied from a blower or compressor, but the moisture in the air must be removed prior to introduction into the packed layer since it will inhibit adsorption of nitrogen. The dehumidification of the starting air is usually carried out up to the dew point of −50° C. The temperature of the starting air is closely related to the performance of the adsorbent and therefore heating or cooling are often carried out to adequately bring out the performance of the adsorbent, but the temperature will normally be about 15–35° C.

A higher adsorption pressure in the adsorption step increases the amount of nitrogen adsorption. Considering the load on the blower or compressor which supplies the starting air, the adsorption pressure is preferably from 600 Torr to 1520 Torr, inclusive.

The regeneration pressure during the regeneration step may be lower than the adsorption pressure, and a lower pressure is preferred since this will facilitate desorption of nitrogen. In order to achieve a lower regeneration pressure, a vacuum pump may be used. In this case, considering the load on the vacuum pump, the regeneration pressure is preferably from 100 Torr to 400 Torr, inclusive.

The repressurization step uses the concentrated oxygen gas obtained in the adsorption step, and therefore a high repressurization pressure will reduce the amount of concentrated oxygen gas drawn out as the product gas. If the repressurization pressure is low when the adsorption step commences, the pressurized starting air may break through to the exit port of the packed layer without adsorption of nitrogen onto the adsorbent. In order to prevent breakthrough of the nitrogen in the starting air to the exit port of the packed layer, the first 1–5 seconds after commencement of the adsorption step may be used to return the concentrated oxygen to the packed layer, as a countercurrent to the starting air, in order to restore the pressure. The repressurization pressure is selected to be lower than the adsorption pressure and higher than the regeneration pressure, but when the adsorption pressure and regeneration pressure are set to the aforementioned preferred ranges, the repressurization pressure is preferably from 400 Torr to 800 Torr, inclusive.

The high purity, low silica X-type zeolite binderless shaped product of the invention is particularly effective for air separation by the PSA method. When air is separated by the PSA method, the amount and yield of concentrated oxygen gas drawn out are high, thus allowing smaller power source units during operation of the PSA apparatus. The PSA process can be carried out using an apparatus similar to one shown in FIG. 1.

Effect of the Invention

As explained above, the high purity, low silica X-type zeolite binderless shaped product of the invention has a high content of low silica X-type zeolite, very excellent adsorption performance and very high crush resistance and attrition resistance; for industrial use as an adsorbent system whereby oxygen is separated and concentrated by adsorption separation from a mixed gas composed mainly of nitrogen and oxygen, for example, in which the mixed gas is repeatedly contacted with the low silica X-type zeolite binderless shaped product, it exhibits very excellent oxygen removal performance while also avoiding significant troubles such as clogging of tubes and valves in the adsorbent system, increased pressure drop of the shaped product packed layer or inclusion of foreign substances into the produced gas. According to the invention it is also possible to produce in a simple and rapid manner high purity, low silica X-type zeolite binderless shaped products with very excellent performance as adsorbents.

EXAMPLES

The present invention will now be explained in more detail by way of examples which, however, are in no way intended to restrict the invention.

The methods of measuring the various properties in the examples were as follows.

(1) Chemical Composition Measurement Method

After complete dissolution of a sample using nitric acid and hydrofluoric acid, an ICP emission analyzer (Model Optima 3000, by Perkin Elmer) was used for measurement of the Na, K, Al, Si and Li contents.

(2) Crystal Structure Measurement Method

A sample that had been heat treated at 60° C. or higher was allowed to stand in a desiccator at a temperature of 25° C. and a relative humidity of 80% for 16 hours to prepare a hydrated sample, which was then measured using an X-ray diffraction apparatus (Model PW-1700 by Phillips or Model MxP-3 by MacScience), using CuK α rays ($\lambda$=1.5418 angstroms) generated by 40 kV, 50 mA as the X-ray source, with a step size of 0.020°, a sample time of 1.00 second and a monochrometer.

The relationship between the indexes for faujasite zeolite and the peak positions attributed thereto were as follows.

| Index | $2\theta(°)$ |
|---|---|
| 111 | approx. 6.1° |
| 220 | approx. 10.0° |
| 311 | approx. 11.7° |
| 331 | approx. 15.4° |
| 533 | approx. 23.3° |
| 642 | approx. 26.7° |
| 751 + 555 | approx. 30.9° |

Peak intensity comparison may be made by peak height or peak area, but peak height is used for the invention.

(3) Moisture Equilibrium Adsorption Measurement Method

A sample dried at 60° C. or above was allowed to stand in a desiccator at a temperature of 250 C and a relative humidity of 80% for 16 hours, and was then measured after one hour of strong heating at 9000 C. Specifically, the weight after moisture adsorption was designated as x1 and the weight after strong heating for one hour at 9000 C as X2, and the moisture equilibrium adsorption (%) was determined according to the following equation.

$$\text{Moisture equilibrium adsorption } (\%) = \{(X_1 - X_2)/X_2\} \times 100$$

(4) Crush Resistance Measurement Method

Based on the test method described in JIS-R-5 1608, using a Kiya digital hardness tester (Model KHT-20N by Fujiwara Laboratories), a compression load was applied by pressing a pressure pan (5 mm diameter, stainless steel) onto the calcination-activated shaped product specimen in the diametrical direction at a constant speed (1 mm/sec) in an atmosphere at ordinary temperature and pressure, and the maximum load (units: kgf) withstandable by the shaped product was recorded. The results are expressed as a simple average of 25 measurement values. Since crush resistance is dependent on particle size, the measured samples were sorted as to a size of 1.4–1.7 mm (#10–#12) by sifting.

(5) Attrition Resistance Measurement Method

The attrition resistance was calculated based on the measurement method for particle strength described in JIS-K-1464.

Specifically, the calcination-activated shaped product sample was first allowed to stand in a desiccator at a temperature of 25° C. and a relative humidity of 80% for 16 hours, and then about 70 g of the sample was sifted for 3 minutes using a sieve (Model JIS-Z-8801 by Tokyo Screen Co.) of 850 μm and 355 μm mesh with a catch pan set therein, after which a 50 g portion of the sample remaining after 3 minutes of sifting in the sieve after removal of the adhesion was precisely measured out, five 10 yen copper coins were simultaneously set therein and shaking was performed for 15 minutes. The attrition resistance was calculated by the following equation, with the amount of sample falling in the catch pan represented as Xg.

Attrition resistance (wt %)=(X/50)×100

(6) Si-NMR Measurement Method

The Si-NMR (nuclear magnetic resonance) measurement was measurement of the 29Si-MAS (magic angle spinning) NMR with an NMR apparatus (VXR-300S by Varian). The measurement was conducted using a sample that had been allowed to stand for 16 hours in a desiccator at a temperature of 25° C. and a relative humidity of 80%, and there were observed an Si-3Al peak at −89 ppm and an Si-4Al peak at −84 ppm, with an observation frequency of 59.6 MHz, a pulse width (90° pulse) of 4.4 $\mu$s, a measurement repeat time of 3 s, a repeat cycle of 2000 cycles and a cycle frequency of 9.0 kHz and using tetramethylsilane as an external reference of 0 ppm. The peak heights and areas were compared.

(7) Nitrogen Adsorption Capacity Measurement Method

Approximately 500 mg of sample was weighed out and measured using a Cahn Electron Balance. The pretreatment conditions were: activation at 350° C. for 2 hours under a pressure of no greater than 0.001 mmHg. After cooling, nitrogen gas was introduced, the adsorption temperature was kept at 25° C. and the adsorption pressure at 700 mmHg, the weight was measured when sufficient equilibrium was achieved, and the nitrogen adsorption capacity (Ncc/g) was calculated. A large nitrogen adsorption capacity indicates high performance of adsorption separation of nitrogen from mixed gas containing nitrogen and oxygen.

(8) Air Separation Test by PSA Method

An air separation performance tester such as shown in FIG. 1 was used for an air separation test according to the procedure outlined below.

Approximately 2 L of the low silica X-type zeolite binderless shaped product to be used as the air separation adsorbent is packed into adsorption columns [13] and [14]. For the adsorption step in the adsorption column [12], after dehumidification of the air compressed by a compressor [1] using a dehydration column [2], the pressure is reduced to 0.5–0.6 kg/cm²G with a pressure reduction valve [3], the dew point of air is checked and recorded by a dew point recorder [4] and electromagnetic valves [5] and [7] are opened to initiate circulation in the adsorption column (air temperature: 25° C.). The resulting concentrated oxygen gas is stored in a product tank [17], while a mass flow meter [18] regulates the amount of concentration oxygen gas being drawn out. The pressure at the point of completion of the adsorption step was kept constant 1.4 atm. For the regeneration step in the adsorption column [13], the electromagnetic valves [5] and [7] are closed, an electromagnetic valve [6] is opened, and the pressure in the adsorption column is reduced with a vacuum pump [20]. The pressure at the point of completion of the regeneration step was kept constant at 250 Torr. For the repressurization step in the adsorption column [13], the electromagnetic valve [6] is closed, the electromagnetic valve [8] is opened, and the adsorption column pressure is repressurized by the concentrated oxygen gas in the product tank [17]. The pressure at the point of completion of the repressurization step was kept constant at 500 Torr. The pressure is measured with a pressure gauge [5] (the pressure gauge [16] was used for the adsorption column [14]). The repressurized adsorption column [13] is then used for an adsorption step, and this series of steps is repeated. The time for each of the steps was one minute for the adsorption step and 30 seconds for the regeneration step and repressurization step. The electromagnetic valve operation was controlled by a sequencer.

The same process is carried out for the adsorption column [14], and magnetic valves [9], [10], [11] and [12] for column [14] work in the same manner as electromagnetic [6], [7] and [8] for column [13] but for continuous drawing out of the concentrated oxygen the regeneration step and repressurization step are carried out in the adsorption column [14] during the adsorption step in the adsorption column [13], while the adsorption step is carried out in the adsorption column [14] during the regeneration step and repressurization step in the adsorption column [13].

After concentration of the concentrated oxygen gas has reached a constant value, it is measured with the oxygen concentration meter [19] and the flow volume of the concentrated oxygen gas is accurately measured from the value by a cumulative flow meter [21] (this will hereunder be referred to as the oxygen volume). The flow volume of the discharge gas that is discharged by the vacuum pump [20] during the regeneration step was measured by the value from a cumulative flow meter [22] (this will hereunder be referred to as the discharge gas volume). The measurement of both gas quantities were conducted at 25° C.

The air separation performance of the adsorbent was expressed as the volume of oxygen at 93% concentration and the proportion of concentrated oxygen gas at 93% concentration that could be recovered from the starting air (hereunder referred to as the recovery rate). The air separation test was conducted at adsorption column temperatures of 0° C. and 25° C.

The oxygen volume was determined by converting the value measured by the cumulative flow meter into standard conditions, and expressing it as the flow rate per hour with 1 kg of adsorbent (anhydrous state), with N liters/(kg·hr) as the units. The recovery rate was calculated by the following equation.

Recovery rate=(oxygen volume×0.93)/(supplied air volume× 0.209)×100(%)

Supplied air volume=(oxygen volume)+(discharge gas volume)

Example 1

First, low silica X-type zeolite powder with an $SiO_2/Al_2O_3$ molar ratio of 1.9–2.1 was synthesized according to the following procedure.

After placing 10,770 g of an aqueous sodium silicate solution ($Na_2O$=3.8 wt %, $SiO_2$=12.6 wt %), 1330 g of water, 1310 g of sodium hydroxide (99% purity) and 3630 g of an industrial use aqueous potassium hydroxide solution (48% purity) in a stainless steel reactor with an internal volume of 20 liters, the mixture was stirred at 100 rpm while maintaining a temperature of 45° C. using a water bath. To this solution there was added 5390 g of an aqueous sodium aluminate solution ($Na_2O$=20.0 wt %, $Al_2O_3$=22.5 wt %) kept at 40° C., over a period of one minute. Immediately after the addition, the solution became white-colored and the gelation of said solution started.

Just before completion of this addition, the viscosity of the entire gel increased and partial accumulation of the slurry occurred at the top of the reactor, but after about 3 minutes the entire gel became uniformly fluid. Upon fluidization of the entire slurry, 4.22 g of low silica X-type zeolite powder (22.5% ignition loss) was added and dispersed in a small amount of water. The amount of low silica X-type zeolite added was 0.1 wt % with respect to the low silica X-type zeolite to be produced. The composition of the slurry after completion of the addition was 3.39 $Na_2O \cdot 1.31$ $K_2O \cdot 1.90$ $SiO_2 \cdot Al_2O_3 \cdot 74.1$ $H_2O$, and the theoretically produced LSX concentration was 14.7 wt %. Stirring was continued at 100 rpm, and the mixture was matured at 45° C. for 4 hours. After aging, the temperature was increased to 70° C. over the period of an hour while stirring. After temperature increase, the stirring was suspended and crystallization was carried out at 70° C. for 8 hours. The resulting crystals were filtered and adequately washed with purified water, and then dried overnight at 70° C.

Figure 4:
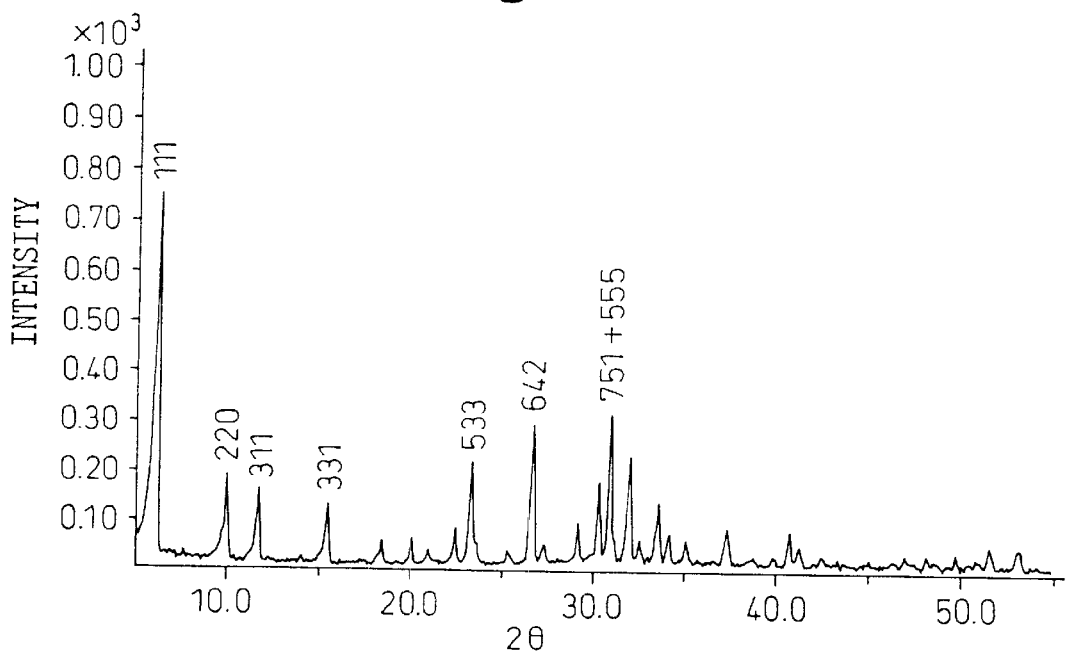
FIG. 4 is an X-ray diffraction pattern for the low silica X-type zeolite powder obtained in Example 1.

FIG. 4 shows the results of X-ray diffraction of the resulting low silica X-type zeolite powder. The results of the X-ray diffraction showed a single phase of faujasite zeolite, and the peak intensities at index 111, 751+555, 642, 533, 220, 311 and 331 for the faujasite zeolite according to X-ray diffraction were in the following order.

| Intensity rank | Index |
| --- | --- |
| 1 | 111 |
| 2 | 751 + 555 |
| 3 | 642 |
| 4 | 533 |
| 5 | 220 |
| 6 | 311 |
| 7 | 331 |

As shown above, the peak intensity at the index of 220 was stronger than the peak intensity at the index of 311. The results of compositional analysis revealed a chemical composition of 0.72 $Na_2O \cdot 0.28$ $K_2O \cdot Al_2O_3 \cdot 2$ $SiO_2$, with an $SiO_2/Al_2O_3$ molar ratio of 2.0 and a moisture equilibrium adsorption of 33.5%.

After mixing 20 parts by weight of kaolin with an $SiO_2/Al_2O_3$ molar ratio of 2.0 (trade name: Hydrite PXN, product of DRY BRANCH KAOLIN) with 100 parts by weight of this low silica X-type zeolite powder for 15 minutes using a MIXMULLER MIXING MACHINE (Model MSG-15S, product of SHINTOKOGYO, LTD), the necessary amount of water was introduced for 15 minutes and the mixture was then kneaded for 1.5 hours. The moisture content of the kneaded product was about 38 wt %.

Figure 5:
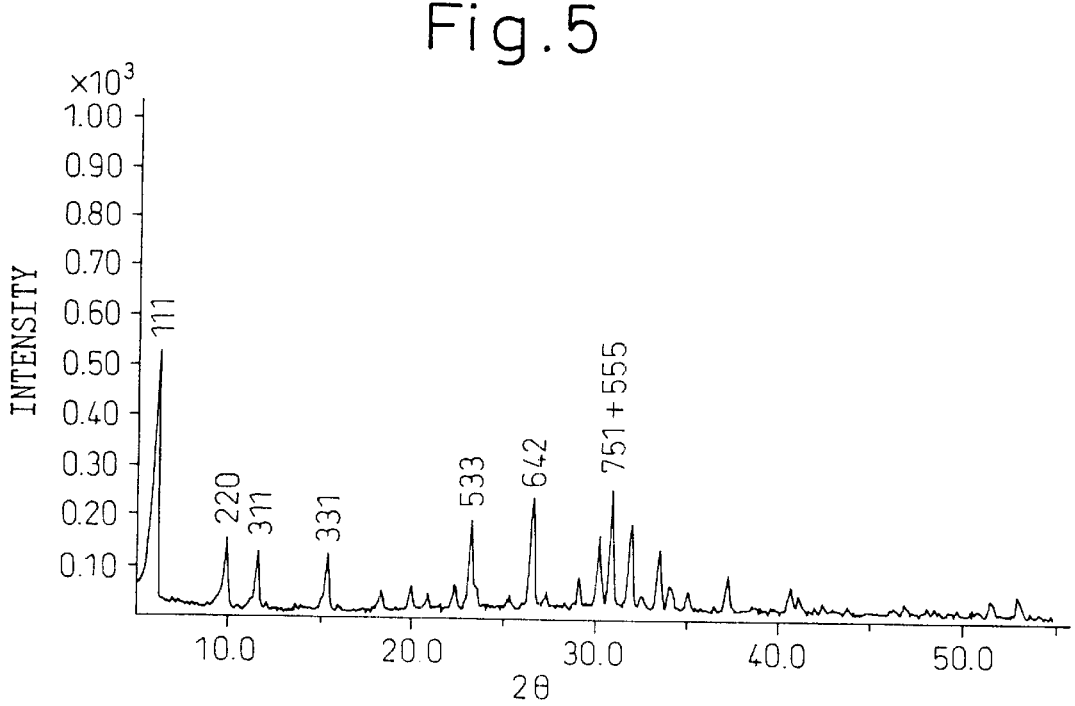
FIG. 5 is an X-ray diffraction pattern for the low silica X-type zeolite-containing shaped product obtained in Example 1.

The kneaded product was stirred and granulated into beads with a size of 1.2–2.0 mm using a blade stirrer granulator-type HENSHEL MIXER (Model FM/I-750, product of MITSUI MINING COMPANY LTD), and after granulation using a MARUMELIZER EXTRUDER (Model Q-1000, product of FUJI PAUDAL), it was dried at 60° C. overnight. A tube furnace (product of ADVANTECH) was then used for calcination at 600° C. for 3 hours under an air stream to convert the kaolin in the granulated product to metakaolin and obtain a low silica X-type zeolite-containing shaped product. The $SiO_2/Al_2O_3$ molar ratio of the low silica X-type zeolite-containing shaped product was 2.0 and the moisture equilibrium adsorption was 27.9%; reverse calculation from the moisture equilibrium adsorption of 33.5% for the low silica X-type zeolite powder starting material showed that the low silica X-type zeolite-containing shaped product contained 20 parts of a binder portion with a moisture equilibrium adsorption of 0% with respect to 100 parts of low silica X-type zeolite. The results of X-ray diffraction are shown in FIG. 5. The results of the X-ray diffraction showed a single phase of faujasite zeolite, and the peak intensities at index 111, 751+555, 642, 533, 220, 311 and 331 according to X-ray diffraction were in the following order.

| Intensity rank | Index |
| --- | --- |
| 1 | 111 |
| 2 | 751 + 555 |
| 3 | 642 |
| 4 | 533 |
| 5 | 220 |
| 6 | 311 |
| 7 | 331 |

As shown above, the peak intensity at the index of 220 was stronger than the peak intensity at the index of 311.

The low silica X-type zeolite-containing shaped product was packed in an amount of 9.0 kg in a 13-liter volume SUS304 column and washed with purified water at 40° C. After washing, 25.2 liters of a caustic solution with a caustic centration of 10.0 mole/liter (NaOH: 7.2 mole/liter, KOH: 2.8 mole/liter) at 40° C. was circulated up from the bottom of the column for 3 hours at 560 cc/min, for aging.

Figure 6:
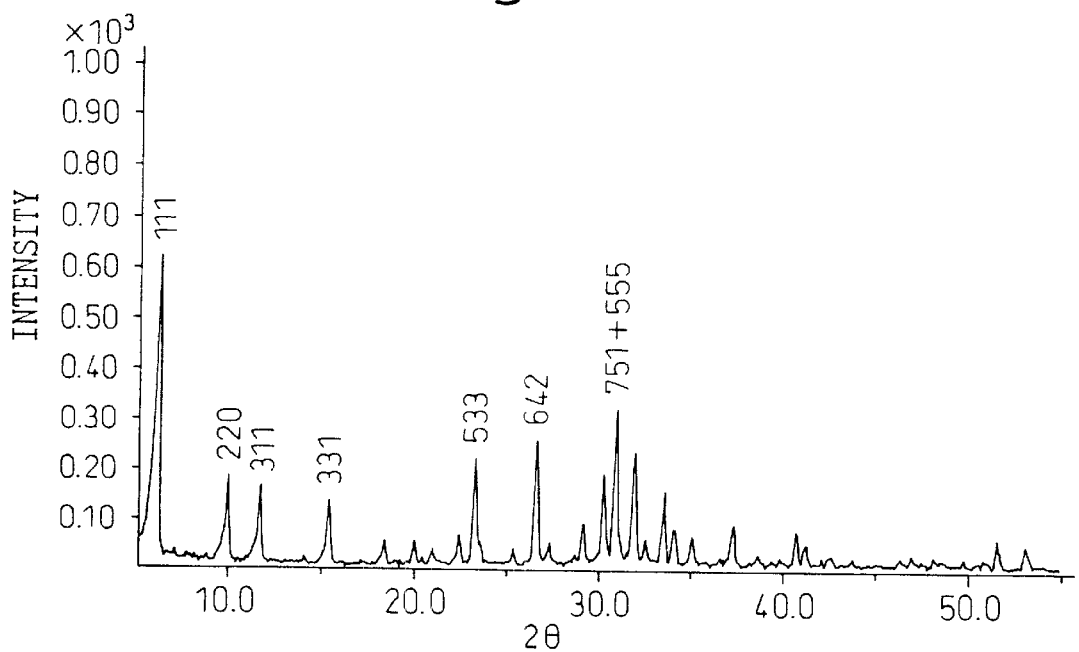
FIG. 6 is an X-ray diffraction pattern for the low silica X-type zeolite binderless shaped product obtained in Example 1.

The temperature of the caustic solution was then increased from 40° C. to 70° C. while continuing the circulation, and crystallization was accomplished by 6 hours of continued circulation. The amount of alkali metal hydroxide in the caustic solution at this time was 18 times the amount sufficient to transform all of the kaolin in the low silica X-type zeolite-containing shaped product to low silica X-type zeolite. After recovering the caustic solution, the inside of the column was thoroughly washed with purified water to obtain a low silica X-type zeolite binderless shaped product. The moisture equilibrium adsorption of the low silica X-type zeolite binderless shaped product was 33.4%, and reverse calculation from the moisture equilibrium adsorption of 33.5% for the low silica X-type zeolite starting material showed that the low silica X-type zeolite content of the low silica X-type zeolite binderless shaped product was 99.7%. The results of X-ray diffraction are shown in FIG. 6. The results of the X-ray diffraction showed a single phase of faujasite zeolite, and the peak intensities at index 111, 751+555, 642, 533, 220, 311 and 331 according to X-ray diffraction were in the following order.

| Intensity rank | Index |
| --- | --- |
| 1 | 111 |
| 2 | 751 + 555 |
| 3 | 642 |
| 4 | 533 |
| 5 | 220 |
| 6 | 311 |
| 7 | 331 |

As shown above, the peak intensity at the index of 220 was stronger than the peak intensity at the index of 311. The results of Si-NMR confirmed a very weak peak due to Si-3Al, and the (Si-3Al peak intensity)/(Si-4Al peak intensity) ratio was 0.06.

Figure 7:
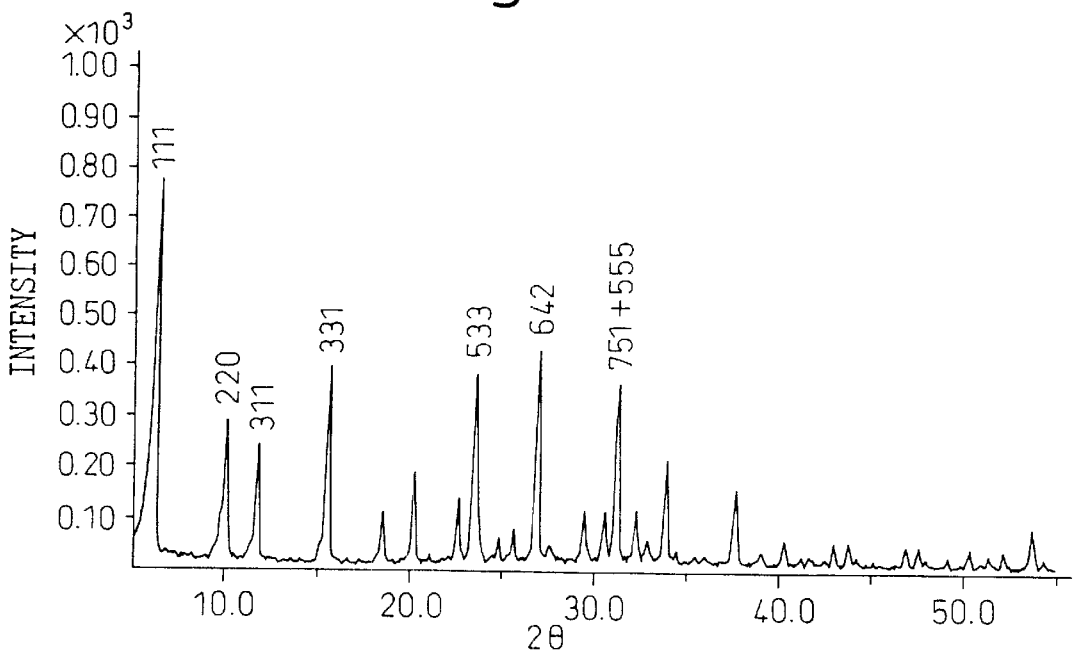
FIG. 7 is an X-ray diffraction pattern for the Li-type low silica X-type zeolite binderless shaped product obtained in Example 1.

The low silica X-type zeolite binderless shaped product was contacted with an aqueous lithium chloride solution which had been pH adjusted with lithium hydroxide, and thorough washing yielded a Li-type low silica X-type zeolite binderless shaped product. The results of X-ray diffraction of this Li-type low silica X-type zeolite binderless shaped product are shown in FIG. 7. The results of the X-ray diffraction showed that the peak intensities at index 111, 642, 331, 533, 751+555, 220 and 311 for the faujasite zeolite were in the following order.

| Intensity rank | Index |
| --- | --- |
| 1 | 111 |
| 2 | 642 |
| 3 | 331 |
| 4 | 533 |
| 5 | 751 + 555 |
| 6 | 220 |
| 7 | 311 |

As shown above, the peak intensity at the index of 220 was stronger than the peak intensity at the index of 311. As a result of chemical analysis of the product, the Li ion-exchange rate was 98.3%, the Na and K ion-exchange rates were 1.2% and 0.4% respectively, and the $SiO_2/Al_2O_3$ molar ratio was 1.96.

The obtained low silica X-type zeolite binderless shaped product was subjected to calcination-activation at 500° C. for 3 hours under a dehumidified air stream using a tube furnace (product of ADVANTECH). The nitrogen adsorption capacity of the low silica X-type zeolite binderless shaped product obtained by this process was 28.68 Ncc/g.

Example 2

The same low silica X-type zeolite-containing shaped product as in Example 1 was packed and an amount of 4.0 kg in a 5.7 liter volume polypropylene column, and washed with purified water at 40° C. After the washing, 15.9 liters of a caustic solution with a caustic concentration of 6.1 mole/liter (NaOH: 4.4 mole/liter, KOH: 1.7 mole/liter) at 40° C. was circulated up from the bottom of the column, and after exchanging the interior of the column with the caustic solution, circulation was suspended and the column was allowed to stand for 3 hours for aging. The temperature of the caustic solution was then increased from 40° C. to 70° C. while resuming the circulation of the caustic solution at 300 cc/min, and crystallization was accomplished by 22 hours of continued circulation. The amount of alkali metal hydroxide in the caustic solution at this time was 14.5 times the amount sufficient to transform all of the kaolin in the low silica X-type zeolite-containing shaped product to low silica X-type zeolite.

Figure 8:
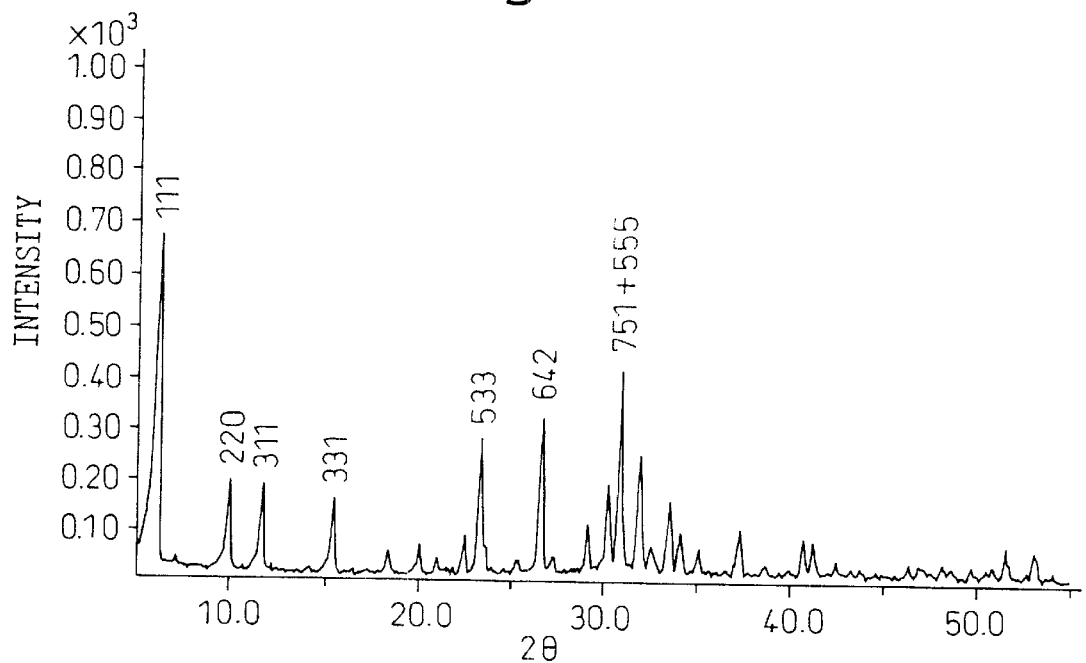
FIG. 8 is an X-ray diffraction pattern for the low silica X-type zeolite binderless shaped product obtained in Example 2.

After recovering the caustic solution, the inside of the column was thoroughly washed with purified water to obtain a low silica X-type zeolite binderless shaped product. The moisture equilibrium adsorption of the low silica X-type zeolite binderless shaped product was 33.1%, and reverse calculation from the moisture equilibrium adsorption of 33.5% for low silica X-type zeolite showed that the low silica X-type zeolite content of the low silica X-type zeolite binderless shaped product was 98.8%. The results of X-ray diffraction are shown in FIG. 8. The results of the X-ray diffraction showed a single phase of faujasite zeolite, and the peak intensities at index 111, 751+555, 642, 533, 220, 311 and 331 according to X-ray diffraction were in the following order.

| Intensity rank | Index |
| --- | --- |
| 1 | 111 |
| 2 | 751 + 555 |
| 3 | 642 |
| 4 | 533 |
| 5 | 220 |
| 6 | 311 |
| 7 | 331 |

As shown above, the peak intensity at the index of 220 was stronger than the peak intensity at the index of 311. The results of Si-NMR confirmed a very weak peak due to Si-3Al, and the (Si-3Al peak intensity)/(Si-4Al peak intensity) ratio was 0.05.

Figure 9:
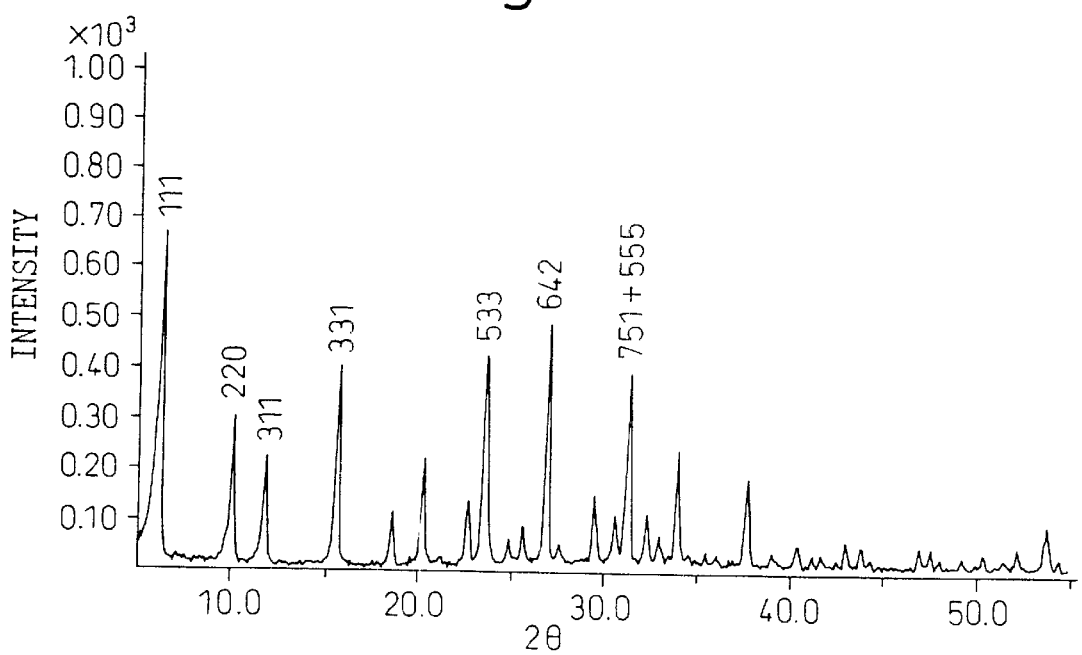
FIG. 9 is an X-ray diffraction pattern for the Li-type low silica X-type zeolite binderless shaped product obtained in Example 2.

The low silica X-type zeolite binderless shaped product was contacted with an aqueous lithium chloride solution which had been pH adjusted with lithium hydroxide, and thorough washing yielded a Li-type low silica X-type zeolite binderless shaped product. The results of X-ray diffraction of this Li-type low silica X-type zeolite binderless shaped product are shown in FIG. 9. The results of the X-ray diffraction showed that the peak intensities at index 111, 642, 533, 331, 751+555, 220 and 311 for the faujasite zeolite were in the following order.

| Intensity rank | Index |
| --- | --- |
| 1 | 111 |
| 2 | 642 |
| 3 | 533 |
| 4 | 331 |
| 5 | 751 + 555 |
| 6 | 220 |
| 7 | 311 |

As shown above, the peak intensity at the index of 220 was stronger than the peak intensity at the index of 311. As a result of chemical analysis of the product, the Li ion-exchange rate was 98.7%, the Na and K ion-exchange rates were 1.1% and 0.1% respectively, and the $SiO_2/Al_2O_3$ molar ratio was 1.98.

The obtained low silica X-type zeolite binderless shaped product was subjected to calcination-activation in the same manner as Example 1. The nitrogen adsorption capacity of the low silica X-type zeolite binderless shaped product obtained by this process was 28.97 Ncc/g.

Comparative Example 1

The same low silica X-type zeolite-containing shaped product as in Example 1 was packed in an amount of 2.2 kg in a 3.1 liter volume polypropylene column, and was washed with purified water at 40° C. After the washing, 16.2 liters of a caustic solution with a caustic concentration of 3.1 mole/liter (NaOH: 2.2 mole/liter, KOH: 0.9 mole/liter) at 40° C. was circulated up from the bottom of the column for 3 hours at 220 cc/min, for aging. The temperature of the caustic solution was then increased from 40° C. to 70° C. while continuing the circulation, and crystallization was accomplished by 6 hours of continued circulation. The amount of alkali metal hydroxide in the caustic solution at this time was 15 times the amount sufficient to transform all of the kaolin in the low silica X-type zeolite-containing shaped product to low silica X-type zeolite.

Figure 10:
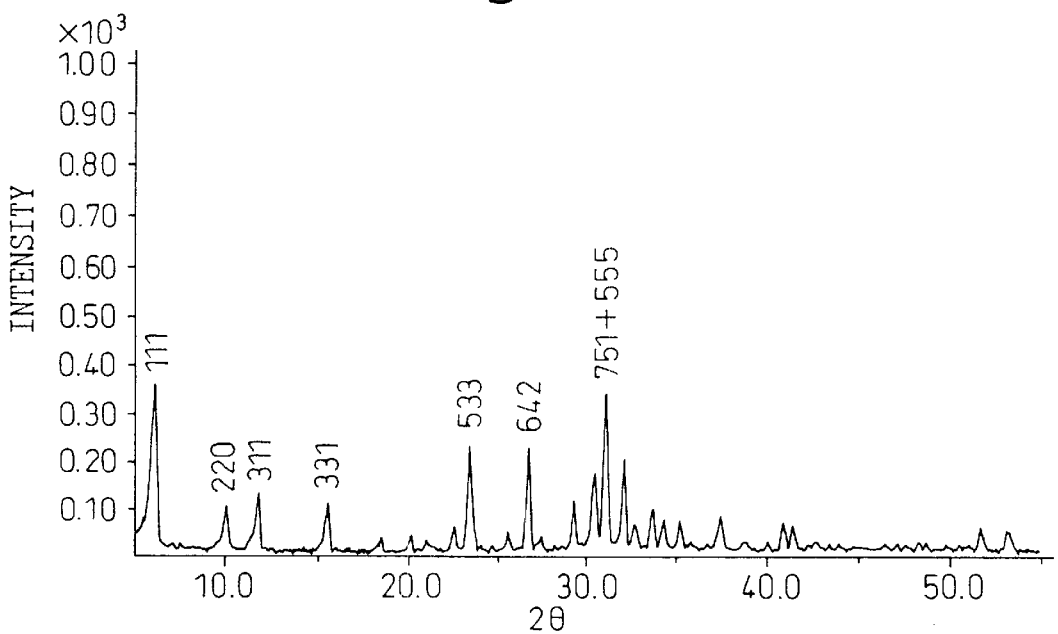
FIG. 10 is an X-ray diffraction pattern for the low silica X-type zeolite binderless shaped product obtained in Comparative Example 1.

After recovering the caustic solution, the inside of the column was thoroughly washed with purified water to obtain a low silica X-type zeolite binderless shaped product. The moisture equilibrium adsorption of the low silica X-type zeolite binderless shaped product was 31.5%, and reverse calculation from the moisture equilibrium adsorption of 33.5% for low silica X-type zeolite showed that the low silica X-type zeolite content of the low silica X-type zeolite binderless shaped product was 94.0%. The results of X-ray diffraction are shown in FIG. 10. The results of the X-ray diffraction showed a single phase of faujasite zeolite, and the peak intensities at index 111, 751+555, 642, 533, 220, 311 and 331 according to X-ray diffraction were in the following order.

| Intensity rank | Index |
| --- | --- |
| 1 | 111 |
| 2 | 751 + 555 |
| 3 | 533 |
| 4 | 642 |
| 5 | 311 |
| 6 | 331 |
| 7 | 220 |

This differed significantly from the order of the present invention, the peak intensity at the index of 220 being weaker than the peak intensity at the index of 311, the peak intensity at the index of 533 being stronger than the peak intensity at the index of 642, and the peak intensity at the index of 331 also being stronger than the peak intensity at the index of 220. The results of Si-NMR confirmed a peak due to Si-3Al, and the (Si-3Al peak intensity)/(Si-4Al peak intensity) ratio was 0.12.

Figure 11:
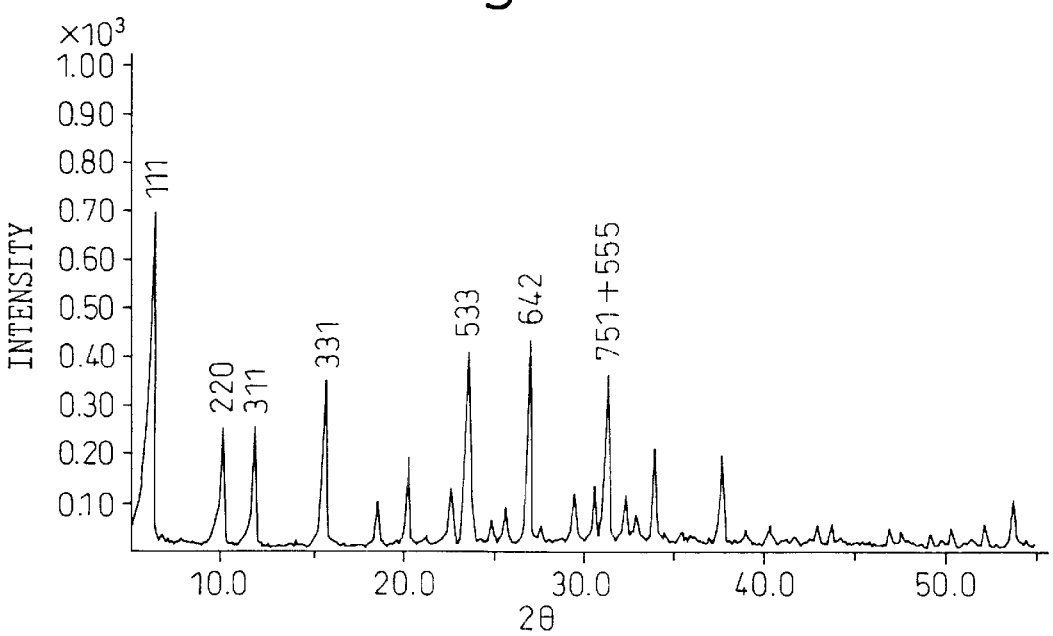
FIG. 11 is an X-ray diffraction pattern for the Li-type low silica X-type zeolite binderless shaped product obtained in Comparative Example 1.

The low silica X-type zeolite binderless shaped product was contacted with an aqueous lithium chloride solution which had been pH adjusted with lithium hydroxide, and thorough washing yielded a Li-type low silica X-type zeolite binderless shaped product. The results of X-ray diffraction of this Li-type low silica X-type zeolite binderless shaped product are shown in FIG. 11. The X-ray diffraction results showed that the peak intensities at index 111, 642, 533, 331, 751+555, 220 and 311 for the faujasite zeolite were in the following order.

| Intensity rank | Index |
| --- | --- |
| 1 | 111 |
| 2 | 642 |
| 3 | 533 |
| 4 | 751 + 555 |
| 5 | 331 |
| 6 | 311 |
| 7 | 220 |

This differed significantly from the order of the present invention, the peak intensity at the index of 220 being weaker than the peak intensity at the index of 311, and the peak intensity at the index of 751+555 being stronger than the peak intensity at the index of 331. As a result of chemical analysis of the product, the Li ion-exchange rate was 97.9%, the Na and K ion-exchange rates were 1.9% and 0.2% respectively, and the $SiO_2/Al_2O_3$ molar ratio was 2.04.

The obtained low silica X-type zeolite binderless shaped product was subjected to calcination-activation in the same manner as Example 1. The nitrogen adsorption capacity of the low silica X-type zeolite binderless shaped product obtained by this process was 26.41 Ncc/g, and when compared with the low silica X-type zeolite binderless shaped product of Example 1 and the low silica X-type zeolite binderless shaped product of Example 2, the LSX contents were reduced by 6% and 5%, while the nitrogen adsorption capacities were reduced by 8% and 9%.

Example 3

The same low silica X-type zeolite-containing shaped product as in Example 1 was packed in an amount of 2.2 kg in a 3.1 liter volume polypropylene column, and was washed with purified water at 70° C. After the washing, 5.94 liters of a caustic solution with a caustic concentration of 10.0 mole/liter (NaOH: 7.2 mole/liter, KOH: 2.8 mole/liter, Al: 0.00 mole/liter, Si: 0.00 mole/liter) at 70° C. was circulated up from the bottom of the column for 6 hours at 220 cc/min, for aging. The amount of alkali metal hydroxide in the caustic solution at this time was 18 times the amount sufficient to transform all of the kaolin in the low silica X-type zeolite-containing shaped product to low silica X-type zeolite. After recovering the caustic solution, the inside of the column was thoroughly washed with purified water to obtain a low silica X-type zeolite binderless shaped product. The moisture equilibrium adsorption of the low silica X-type zeolite binderless shaped product was 33.4%, and reverse calculation from the moisture equilibrium adsorption of 33.5% for low silica X-type zeolite showed that the low silica X-type zeolite content of the low silica X-type zeolite binderless shaped product was 99.7%. The results of X-ray diffraction showed a single phase of faujasite zeolite, and no diffraction curve due to impurities was found. The results of Si-NMR confirmed no peak due to Si-3Al, and the (Si-3Al peak intensity)/(Si-4Al peak intensity) ratio was 0.00. The results of chemical analysis of the recovered caustic solution were NaOH: 6.6 mole/liter, KOH: 2.5 mole/liter, Al: 0.07 mole/liter, Si: 0.09 mole/liter.

The low silica X-type zeolite binderless shaped product was contacted with an aqueous lithium chloride solution which had been pH adjusted with lithium hydroxide, and thorough washing yielded a Li-type low silica X-type zeolite binderless shaped product. As a result of chemical analysis of this Li-type low silica X-type zeolite binderless shaped product, the Li ion-exchange rate was 96.8%, the Na and K ion-exchange rates were 2.6% and 0.6% respectively, and the $SiO_2/Al_2O_3$ molar ratio was 1.96. The obtained low silica X-type zeolite binderless shaped product was subjected to calcination-activation in the same manner as Example 1. The nitrogen adsorption capacity of the low silica X-type zeolite binderless shaped product obtained by this process was 26.8 Ncc/g, the crush resistance was 1.7 kgf, and the attrition rate was 0.01%. An air separation test of the low silica X-type zeolite binderless shaped product by the PSA method indicated very high PSA performance with an oxygen volume of 120.0 N liter/(kg·hr) and a recovery rate of 59.6%.

Example 4

The same low silica X-type zeolite-containing shaped product as in Example 1 was subjected to binderless conversion treatment in the same basic manner as Example 3, using 4.05 liters of a caustic solution with a caustic concentration of 12.0 mole/liter (NaOH: 8.6 mole/liter, KOH: 3.4 mole/liter, Al: 0.00 mole/liter, Si: 0.00 mole/liter). The amount of alkali metal hydroxide in the caustic solution at this time was 15 times the amount sufficient to transform all of the kaolin in the low silica X-type zeolite-containing shaped product to low silica X-type zeolite.

After recovering the caustic solution, the inside of the column was thoroughly washed with purified water to obtain a low silica X-type zeolite binderless shaped product. The moisture equilibrium adsorption of the low silica X-type zeolite binderless shaped product was 33.7%, and reverse calculation from the moisture equilibrium adsorption of 33.5% for low silica X-type zeolite showed that the low silica X-type zeolite content of the low silica X-type zeolite binderless shaped product was approximately 100%. The results of X-ray diffraction showed a single phase of faujasite zeolite, and no diffraction curve due to impurities was found. The results of Si-NMR confirmed no peak due to Si-3Al, and the (Si-3Al peak intensity)/(Si-4Al peak intensity) ratio was 0.00. The results of chemical analysis of the recovered caustic solution were NaOH: 6.7 mole/liter, KOH: 2.5 mole/liter, Al: 0.07 mole/liter, Si: 0.08 mole/liter.

The low silica X-type zeolite binderless shaped product was contacted with an aqueous lithium chloride solution which had been pH adjusted with lithium hydroxide, and thorough washing yielded a Li-type low silica X-type zeolite binderless shaped product. As a result of chemical analysis of this Li-type low silica X-type zeolite binderless shaped product, the Li ion-exchange rate was 98.0%, the Na and K ion-exchange rates were 1.5% and 0.3% respectively, and the $SiO_2/Al_2O_3$ molar ratio was 1.97.

The obtained low silica X-type zeolite binderless shaped product was subjected to calcination-activation in the same manner as Example 1. The nitrogen adsorption capacity of the low silica X-type zeolite binderless shaped product obtained by this process was 27.8 Ncc/g, the crush resistance was 1.0 kgf, and the attrition rate was 0.03%. An air separation test of the low silica X-type zeolite binderless shaped product by the PSA method indicated very high PSA performance with an oxygen volume of 122.0 N liter/(kg·hr) and a recovery rate of 59.0%.

Example 5

The same low silica X-type zeolite-containing shaped product as in Example 1 was subjected to binderless conversion treatment in the same basic manner as Example 3, using 8.1 liters of a caustic solution with a caustic concentration of 6.0 mole/liter (NaOH: 4.3 mole/liter, KOH: 1.7 mole/liter, Al: 0.06 mole/liter, Si: 0.00 mole/liter), to which 110 g of an aqueous sodium aluminate solution ($Na_2O$=20.0 wt %, $Al_2O_3$=22.5 wt %) had been added beforehand.

The amount of alkali metal hydroxide in the caustic solution at this time was 15 times the amount sufficient to transform all of the kaolin in the low silica X-type zeolite-containing shaped product to low silica X-type zeolite. After recovering the caustic solution, the inside of the column was thoroughly washed with purified water to obtain a low silica X-type zeolite binderless shaped product. The moisture equilibrium adsorption of the low silica X-type zeolite binderless shaped product was 33.5%, and reverse calculation from the moisture equilibrium adsorption of 33.5% for low silica X-type zeolite showed that the low silica X-type zeolite content of the low silica X-type zeolite binderless shaped product was approximately 100%. The results of X-ray diffraction showed a single phase of faujasite zeolite, and no diffraction curve due to impurities was found. The results of Si-NMR confirmed no peak due to Si-3Al, and the (Si-3Al peak intensity)/(Si-4Al peak intensity) ratio was 0.08. The results of chemical analysis of the recovered caustic solution were NaOH: 3.6 mole/liter, KOH: 1.4 mole/liter, Al: 0.05 mole/liter, Si: 0.04 mole/liter.

The low silica X-type zeolite binderless shaped product was contacted with an aqueous lithium chloride solution which had been pH adjusted with lithium hydroxide, and thorough washing yielded a Li-type low silica X-type zeolite binderless shaped product. As a result of chemical analysis of this Li-type low silica X-type zeolite binderless shaped product, the Li ion-exchange rate was 98.3%, the Na and K ion-exchange rates were 1.2% and 0.4% respectively, and the $SiO_2/Al_2O_3$ molar ratio was 1.98. The obtained low silica X-type zeolite binderless shaped product was subjected to calcination-activation in the same manner as Example 1.

The nitrogen adsorption capacity of the low silica X-type zeolite binderless shaped product obtained by this process was 28.5 Ncc/g, the crush resistance was 1.1 kgf, and the attrition rate was 0.05%. An air separation test of the low silica X-type zeolite binderless shaped product by the PSA method indicated very high PSA performance with an oxygen volume of 123.0 N liter/(kg·hr) and a recovery rate of 59.2%.

Comparative Example 2

The same low silica X-type zeolite-containing shaped product as in Example 1 was subjected to binderless conversion treatment in the same basic manner as Example 1, using 16.2 liters of a caustic solution with a caustic concentration of 3.0 mole/liter (NaOH: 2.2 mole/liter, KOH: 0.8 mole/liter, Al: 0.00 mole/liter, Si: 0.00 mole/liter). The amount of alkali metal hydroxide in the caustic solution at this time was 15 times the amount sufficient to transform all of the kaolin in the low silica X-type zeolite-containing shaped product to low silica X-type zeolite.

After recovering the caustic solution, the inside of the column was thoroughly washed with purified water to obtain a low silica X-type zeolite binderless shaped product. The moisture equilibrium adsorption of the low silica X-type zeolite binderless shaped product was 31.7%, and reverse calculation from the moisture equilibrium adsorption of 33.5% for low silica X-type zeolite showed that the low silica X-type zeolite content of the low silica X-type zeolite binderless shaped product was 94.6%. The results of X-ray diffraction showed a diffraction curve due to A-type zeolite in addition to the diffraction curve due to faujasite zeolite. The results of Si-NMR confirmed a peak due to Si-3Al, and the (Si-3Al peak intensity)/(Si-4Al peak intensity) ratio was 0.13. The results of chemical analysis of the recovered caustic solution were NaOH: 2.0 mole/liter, KOH: 0.8 mole/liter, Al: 0.04 mole/liter, Si: 0.03 mole/liter.

The low silica X-type zeolite binderless shaped product was contacted with an aqueous lithium chloride solution which had been pH adjusted with lithium hydroxide, and thorough washing yielded a Li-type low silica X-type zeolite binderless shaped product. As a result of chemical analysis of this Li-type low silica X-type zeolite binderless shaped product, the Li ion-exchange rate was 97.9%, the Na and K ion-exchange rates were 1.9% and 0.2% respectively, and the $SiO_2/Al_2O_3$ molar ratio was 2.04.

The obtained low silica X-type zeolite binderless shaped product was subjected to calcination-activation in the same manner as Example 1. The nitrogen adsorption capacity of the low silica X-type zeolite binderless shaped product obtained by this process was 26.3 Ncc/g, which nitrogen adsorption capacity was 1.1% lower than that of the low silica X-type zeolite binderless shaped product of Example 3 in which the Li ion-exchange rate was 2.1% lower. The crush resistance was 0.6 kgf, the attrition rate was 0.37%, and the strength was much lower compared to Examples 3 and 4. An air separation test of the low silica X-type zeolite binderless shaped product by the PSA method indicated lower PSA performance with an oxygen volume of 118.0 N liter/(kg·hr) and a recovery rate of 58.5%.

Comparative Example 3

The same low silica X-type zeolite-containing shaped product as in Example 1 was subjected to binderless conversion treatment in the same basic manner as Example 3, using 8.1 liters of a caustic solution with a caustic concentration of 6.0 mole/liter (NaOH: 4.3 mole/liter, KOH: 1.7 mole/liter, Al: 0.00 mole/liter, Si: 0.00 mole/liter). The amount of alkali metal hydroxide in the caustic solution at this time was 15 times the amount sufficient to transform all of the kaolin in the low silica X-type zeolite-containing shaped product to low silica X-type zeolite.

After recovering the caustic solution, the inside of the column was thoroughly washed with purified water to obtain a low silica X-type zeolite binderless shaped product. The moisture equilibrium adsorption of the low silica X-type zeolite binderless shaped product was 33.1%, and reverse calculation from the moisture equilibrium adsorption of 33.5% for low silica X-type zeolite showed that the low silica X-type zeolite content of the low silica X-type zeolite binderless shaped product was 98.8%. The results of X-ray diffraction showed a very weak diffraction curve due to A-type zeolite in addition to the diffraction curve due to faujasite zeolite. The results of Si-NMR confirmed a peak due to Si-3Al, and the (Si-3Al peak intensity)/(Si-4Al peak intensity) ratio was 0.11. The results of chemical analysis of the recovered caustic solution were NaOH: 3.6 mole/liter, KOH: 1.4 mole/liter, Al: 0.05 mole/liter, Si: 0.05 mole/liter.

The low silica X-type zeolite binderless shaped product was contacted with an aqueous lithium chloride solution which had been pH adjusted with lithium hydroxide, and thorough washing yielded a Li-type low silica X-type zeolite binderless shaped product. As a result of chemical analysis of this Li-type low silica X-type zeolite binderless shaped product, the Li ion-exchange rate was 97.4%, the Na and K ion-exchange rates were 2.4% and 0.3% respectively, and the $SiO_2/Al_2O_3$ molar ratio was 2.04. The obtained low silica X-type zeolite binderless shaped product was subjected to calcination-activation in the same manner as Example 1.

The nitrogen adsorption capacity of the low silica X-type zeolite binderless shaped product obtained by this process was 25.7 Ncc/g, the nitrogen adsorption capacity was 4.2% lower than the low silica X-type zeolite binderless shaped product of Example 3 in which the Li ion-exchange rate was 0.6% lower. The crush resistance was 0.8 kgf, the attrition rate was 0.21%, and the strength was lower compared to Example 5. An air separation test of the low silica X-type zeolite binderless shaped product by the PSA method indicated lower PSA performance with an oxygen volume of 116.0 N liter/(kg·hr) and a recovery rate of 58.2%.

Example 6

The same low silica X-type zeolite-containing shaped product as in Example 1 was packed in an amount of 2.2 kg in a 3.1 liter volume polypropylene column, and was washed with purified water at 70° C. After the washing, 8.1 liters of a caustic solution with a caustic concentration of 6.0 mole/liter (NaOH: 4.3 mole/liter, KOH: 1.7 mole/liter, Al: 0.03 mole/liter, Si: 0.04 mole/liter) at 70° C. into which 35 g of low silica X-type zeolite powder had been added and thoroughly dissolved by stirring was circulated up from the bottom of the column for 6 hours at 220 cc/min. The amount of alkali metal hydroxide in the caustic solution at this time was 15 times the amount sufficient to transform all of the kaolin in the low silica X-type zeolite-containing shaped product to low silica X-type zeolite. After recovering the caustic solution, the inside of the column was thoroughly washed with purified water to obtain a low silica X-type zeolite binderless shaped product. The moisture equilibrium adsorption of the low silica X-type zeolite binderless shaped product was 32.9%, and reverse calculation from the moisture equilibrium adsorption of 33.5% for low silica X-type zeolite showed that the low silica X-type zeolite content of the low silica X-type zeolite binderless shaped product was 98.2%. The results of Si-NMR confirmed a slight peak due to Si-3Al, and the (Si-3Al peak intensity)/(Si-4Al peak intensity) ratio was 0.08.

The results of chemical analysis of the obtained binderless low silica X-type zeolite shaped product showed a $SiO_2/Al_2O_3$ molar ratio of 1.98, and (Na+K)/Al of 1.0; thus confirming almost total binderless conversion. The obtained binderless low silica X-type zeolite shaped product was subjected to calcination-activation at 500° C. for 3 hours under a dehumidified air stream using a tube furnace (product of ADVANTECH). The crush resistance of the binderless low silica X-type zeolite shaped product obtained by this process was 1.0 kgf, and the attrition rate was 0.08%.

Example 7

A binderless low silica X-type zeolite shaped product was obtained basically in the same manner as Example 6, except for using as the caustic solution 8.1 liters of a caustic solution with a caustic concentration of 6.0 mole/liter (NaOH: 4.3 mole/liter, KOH: 1.7 mole/liter, Al: 0.03 mole/liter, Si: 0.03 mole/liter) at 70° C., obtained by adding and thoroughly stirring and dissolving water, sodium hydroxide and potassium hydroxide into the caustic solution recovered after its use in Example 1. The moisture equilibrium adsorption of the low silica X-type zeolite binderless shaped product was 33.4%, and reverse calculation from the moisture equilibrium adsorption of 33.5% for low silica X-type zeolite showed that the low silica X-type zeolite content of the low silica X-type zeolite binderless shaped product was 99.7%. The results of Si-NMR confirmed a slight peak due to Si-3Al, and the (Si-3Al peak intensity)/(Si-4Al peak intensity) ratio was 0.05.

The results of chemical analysis of the obtained binderless low silica X-type zeolite shaped product showed a $SiO_2/Al_2O_3$ molar ratio of 1.99, and (Na+K)/Al of 1.0, thus confirming almost total binderless conversion. The obtained binderless low silica X-type zeolite shaped product was subjected to calcination-activation in the same manner as Example 1. The crush resistance of the binderless low silica X-type zeolite shaped product obtained by this process was 1.1 kgf, and the attrition rate was 0.10%.

Example 8

A binderless low silica X-type zeolite shaped product was obtained basically in the same manner as Example 6, except for using as the caustic solution 8.1 liters of a caustic solution with a caustic concentration of 6.2 mole/liter (NaOH: 4.6 mole/liter, KOH: 1.8 mole/liter, Al: 0.12 mole/liter, Si: 0.12 mole/liter) at 70° C., obtained by adding 210 g of kaolin powder which had been converted to metakaolin by calcination at 600° C. for 3 hours under an air stream and thoroughly dissolving by stirring, and then separating the insoluble solids by decantation. The moisture equilibrium adsorption of the low silica X-type zeolite binderless shaped product was 33.1%, and reverse calculation from the moisture equilibrium adsorption of 33.5% for low silica X-type zeolite showed that the low silica X-type zeolite content of the low silica X-type zeolite binderless shaped product was 99.8%. The results of Si-NMR confirmed a slight peak due to Si-3Al, and the (Si-3Al peak intensity)/(Si-4Al peak intensity) ratio was 0.08.

The results of chemical analysis of the obtained binderless low silica X-type zeolite shaped product showed a $SiO_2/Al_2O_3$ molar ratio of 1.99, and (Na+K)/Al of 1.0, thus confirming almost total binderless conversion.

The obtained binderless low silica X-type zeolite shaped product was subjected to calcination-activation in the same manner as Example 1. The crush resistance of the binderless low silica X-type zeolite shaped product obtained by this process was 1.4 kgf, and the attrition rate was 0.05%.

Example 9

A binderless low silica X-type zeolite shaped product was obtained basically in the same manner as Example 1, except for using as the caustic solution 8.1 liters of a caustic solution with a caustic concentration of 6.1 mole/liter (NaOH: 4.4 mole/liter, KOH: 1.7 mole/liter, Al: 0.04 mole/liter, Si: 0.04 mole/liter) at 70° C., obtained by adding and thoroughly stirring and dissolving 155 g of an aqueous sodium silicate solution ($Na_2O$=3.8 wt %, $SiO_2$=12.6 wt %) and 147 g of an aqueous sodium aluminate solution ($Na_2O$= 20.0 wt %, $Al_2O_3$=22.5 wt %). The moisture equilibrium adsorption of the binderless low silica X-type zeolite shaped product was 33.5%, and reverse calculation from the moisture equilibrium adsorption of 33.5% for low silica X-type zeolite showed that the low silica X-type zeolite content of the low silica X-type zeolite binderless shaped product was approximately 100%. The results of Si-NMR confirmed a slight peak due to Si-3Al, and the (Si-3Al peak intensity)/(Si-4Al peak intensity) ratio was 0.08.

The results of chemical analysis of the obtained binderless low silica X-type zeolite shaped product showed a $SiO_2/Al_2O_3$ molar ratio of 1.99, and (Na+K)/Al of 1.0, thus confirming almost total binderless conversion. The obtained binderless low silica X-type zeolite shaped product was subjected to calcination-activation in the same manner as Example 1. The crush resistance of the binderless low silica X-type zeolite shaped product obtained by this process was 1.5 kgf, and the attrition rate was 0.05%.

Comparative Example 4

A binderless low silica X-type zeolite shaped product was obtained basically in the same manner as Example 6, except for using as the caustic solution 8.1 liters of a caustic solution with a caustic concentration of 6.2 mole/liter (NaOH: 4.4 mole/liter, KOH: 1.8 mole/liter, Al: 0.00 mole/liter, Si: 0.00 mole/liter) at 70° C., containing no previously added Al and/or Si. The moisture equilibrium adsorption of the binderless low silica X-type zeolite shaped product was 33.1%, and reverse calculation from the moisture equilibrium adsorption of 33.5% for low silica X-type zeolite showed that the low silica X-type zeolite content of the low silica X-type zeolite binderless shaped product was 98.8%. The results of Si-NMR confirmed a peak due to Si-3Al, and the (Si-3Al peak intensity)/(Si-4A1 peak intensity) ratio was 0.11.

The results of chemical analysis of the obtained binderless low silica X-type zeolite shaped product showed a $SiO_2/$ $Al_2O_3$ molar ratio of 2.04, and (Na+K)/Al of 1.0. The obtained binderless low silica X-type zeolite shaped product was subjected to calcination-activation in the same manner as Example 1. The crush resistance of the binderless low silica X-type zeolite shaped product obtained by this process was measured, but this gave an insignificant measurement of 0.8 kgf while the attrition rate was 0.21%, thus demonstrating lower strength compared to Examples 6–9.

Example 10

Approximately 50 milliliters of a caustic solution at various concentrations (K/(Na+K)=0.28 molar ratio) and a few grams of the LSX powder prepared in Example 1 were charged into a wide-mouthed polyethylene bottle with an inner volume of 100 milliliters, and the bottle was placed in a thermostatic shaker at 70° C. and treated for 24 hours or longer, to thoroughly dissolve the Si and Al in the caustic solution. The supernatant of each resulting solution was completely dissolved using nitric acid and hydrofluoric acid or nitric acid alone, and then an ICP emission analyzer (Model Optima 3000, by Perkin Elmer) was used for measurement of the Si and Al solubilities. FIG. 2 shows the measured solubilities of Si and Al in a 10 mole/liter caustic solution with a K/(Na+K) molar ratio of 0.28 at 70° C. FIG. 3 shows the Si/Al molar ratio in the caustic solution based on their solubilities under the same conditions. As seen in FIGS. 2 and 3, the Si solubility is higher than the Al solubility with a caustic solution concentration of about 6 mole/liter, and this tendency becomes more notable as the caustic solution concentration increases. There is a very clear trend toward a definite difference in the Si solubility and Al solubility when the caustic solution concentration is about 8 mole/liter or greater.

What is claimed is:

1. A high purity, low silica X-type zeolite binderless shaped product, wherein the peak intensity of the faujasite zeolite at the index of 220 is stronger than the peak intensity at the index of 311 according to X-ray diffraction, the content of the low silica X-type zeolite is at least 95% and the $SiO_2/Al_2O_3$ molar ratio is 2.00±0.05.

2. A high purity, low silica X-type zeolite binderless shaped product according to claim 1, wherein the peak intensities at index 111, 751+555, 642, 533, 220, 311 and 331 for the faujasite zeolite according to X-ray diffraction are in the order listed below, from approximately 60% to approximately 90% of the exchangeable cation sites are sodium, and all or a portion of the remainder are potassium.

| Intensity rank | Index |
| --- | --- |
| 1 | 111 |
| 2 | 751 + 555 |
| 3 | 642 |
| 4 | 533 |
| 5 | 220 |
| 6 | 311 |
| 7 | 331 |

3. A high purity, low silica X-type zeolite binderless shaped product according to claim 1, wherein all or a portion of the exchangeable cation sites are ion-exchanged with lithium and, when cations other than lithium are present, they are cations selected from among alkali metals, alkaline earth metals and transition metals or their mixtures.

4. A high purity, low silica X-type zeolite binderless shaped product according to claim 3, wherein the peak intensities at index 111, 642, 331, 533, 751+555, 220 and 311 for the faujasite zeolite according to X-ray diffraction are in the order listed below;

| Intensity rank | Index |
|---|---|
| 1 | 111 |
| 2 | 642 |
| 3 or 4 | 331 or 533 |
| 5 | 751 + 555 |
| 6 | 220 |
| 7 | 311 |

5. A high purity, low silica X-type zeolite binderless shaped product according to claim 1, wherein the ratio of the peak intensity attributed to Si-3Al and the peak intensity attributed to Si-4Al according to Si-NMR measurement is such that:

(peak intensity for Si-3Al)/peak intensity for Si-4Al)<0.1

6. A high purity, low silica X-type zeolite binderless shaped product according to claim 5, wherein the content of the low silica X-type zeolite is 98% or greater.

7. A high purity, low silica X-type zeolite binderless shaped product according to claim 5, wherein the average value for the crush resistance measured for representative particles sorted to a particle size of 1.4–1.7 mm is 0.7 kgf or greater.

8. A high purity, low silica X-type zeolite binderless shaped product according to claim 5, wherein the average value for the crush resistance measured for representative particles sorted to a particle size of 1.4–1.7 mm is 1.0 kgf or greater.

9. A process for production of a high purity, low silica X-type zeolite binderless shaped product according to claim 1, characterized by mixing, kneading, shaping and calcining low silica X-type zeolite with an $SiO_2/Al_2O_3$ molar ratio of from 1.9 to 2.1 inclusive and kaolin clay with an $SiO_2/Al_2O_3$ molar ratio of from 1.9 to 2.1 inclusive, to obtain a low silica X-type zeolite-containing shaped product, and contacting said low silica X-type zeolite-containing shaped product with a caustic solution to convert all or a portion of the kaolin clay in said low silica X-type zeolite-containing shaped product to low silica X-type zeolite, thereby forming a low silica X-type zeolite binderless shaped product with a $SiO_2/Al_2O_3$ molar ratio which is lower than the $SiO_2/Al_2O_3$ molar ratio of the low silica X-type zeolite starting material.

10. A process for production of a high purity, low silica X-type zeolite binderless shaped product according to claim 9, wherein the caustic solution used dissolves a greater amount of Si than Al from said low silica X-type zeolite-containing shaped product.

11. A process for production of a high purity, low silica X-type zeolite binderless shaped product according to claim 9 or claim 10, wherein the shaped product is contacted for at least 10 hours with the caustic solution of 6 moles/liter or greater.

12. A process for production of a high purity, low silica X-type zeolite binderless shaped product according to claim 9 or claim 10, wherein the shaped product is contacted for at least 5 hours with the caustic solution of 8 moles/liter or greater.

13. A process for production of a high purity, low silica X-type zeolite binderless shaped product according to claim 9 or claim 10, wherein the shaped product is contacted with the caustic solution to which Al has been previously added.

14. A gas separation method characterized by contacting a mixed gas with a packed layer which is packed with one or a plurality of high purity, low silica X-type zeolite binderless shaped products according to claim 1 and has a combined or multilayer structure, and selectively adsorbing at least one constituent gas of the constituent gases in the gas.

15. A gas separation method according to claim 14, which is a nitrogen gas/oxygen gas separation method, wherein the gas is air, nitrogen gas is selectively adsorbed onto said packed layer and oxygen gas is allowed to pass through said packed layer for separation from the nitrogen gas.

16. A gas separation method according to claim 15, wherein in pressure swing adsorption, after selective adsorption of nitrogen gas in the air onto the packed layer under high pressure conditions, the pressure is reduced to desorb the adsorbed nitrogen and restore said packed layer.

17. A gas separation method according to claim 16, wherein the operation involves an adsorption step of contacting air with said packed layer to selectively adsorb nitrogen and to collect or discharge concentrated oxygen from an outlet of said packed layer, a regeneration step of interrupting contact between the air and the packed layer to reduce the pressure in the packed layer and to desorb and collect or discharge the adsorbed nitrogen, and a repressurization step of pressurizing the packed layer by the concentrated oxygen obtained in said adsorption step.

18. A gas separation method according to claim 17, wherein the adsorption pressure during the adsorption step is in the range of 600 Torr to 1520 Torr inclusive.

19. A gas separation method according to claim 17, wherein the regeneration pressure during the regeneration step is in the range of 100 Torr to 400 Torr inclusive.

20. A gas separation method according to claim 17, wherein the repressurization pressure during the repressurization step is in the range of 400 Torr to 800 Torr inclusive.

* * * * *